US010017605B2

(12) United States Patent
Trumbo et al.

(10) Patent No.: US 10,017,605 B2
(45) Date of Patent: *Jul. 10, 2018

(54) FOAM COMPOSITIONS

(71) Applicant: Gaco Western, LLC, Waukesha, WI (US)

(72) Inventors: David L. Trumbo, Waukesha, WI (US); Nick Krogman, Pleasant Prairie, WI (US); Daniel S. Nelson, Waukesha, WI (US)

(73) Assignee: GACO WESTERN, LLC, Waukesha, WI (US)

( * ) Notice: Subject to any disclaimer, the term of this patent is extended or adjusted under 35 U.S.C. 154(b) by 141 days.

This patent is subject to a terminal disclaimer.

(21) Appl. No.: 15/151,350

(22) Filed: May 10, 2016

(65) Prior Publication Data

US 2016/0272754 A1    Sep. 22, 2016

Related U.S. Application Data

(63) Continuation of application No. 14/692,467, filed on Apr. 21, 2015, now Pat. No. 9,359,471.

(60) Provisional application No. 61/982,142, filed on Apr. 21, 2014.

(51) Int. Cl.
*C08G 63/00* (2006.01)
*C08J 9/14* (2006.01)
*C08J 9/12* (2006.01)
*C08J 9/02* (2006.01)

(52) U.S. Cl.
CPC ............ *C08G 63/00* (2013.01); *C08J 9/02* (2013.01); *C08J 9/125* (2013.01); *C08J 9/146* (2013.01); *C08J 2203/10* (2013.01); *C08J 2203/142* (2013.01); *C08J 2205/10* (2013.01); *C08J 2207/04* (2013.01); *C08J 2300/105* (2013.01); *C08J 2300/202* (2013.01); *C08J 2361/20* (2013.01); *C08J 2367/00* (2013.01)

(58) Field of Classification Search
CPC .. C08G 63/00; C08G 12/00; C08J 9/02; C08J 9/125; C08J 9/146; C08J 2203/10; C08J 2203/142; C08J 2205/10; C08J 2207/04; C08J 2300/105; C08J 2300/202; C08J 2361/20; C08J 2367/00; C08J 2379/00
See application file for complete search history.

(56) References Cited

U.S. PATENT DOCUMENTS

| | | |
|---|---|---|
| 3,031,271 A | 4/1962 | Weinbrenner |
| 3,047,540 A | 7/1962 | Merten et al. |
| 3,164,557 A | 1/1965 | Merten et al. |
| 3,398,103 A | 8/1968 | Kühlkamp et al. |
| 4,379,862 A | 4/1983 | Wagner |
| 4,525,488 A | 6/1985 | Cuscurida et al. |
| 4,742,147 A | 5/1988 | Nichols |
| 4,772,680 A | 9/1988 | Noomen et al. |
| 4,866,103 A | 9/1989 | Cassidy et al. |
| 4,906,674 A | 3/1990 | Cassidy et al. |
| 4,963,399 A | 10/1990 | Gill |
| 5,011,908 A * | 4/1991 | Hager ............... C08G 18/4072 521/174 |
| 5,051,454 A | 9/1991 | Lemon et al. |
| 5,087,661 A | 2/1992 | Aoki et al. |
| 5,132,367 A | 7/1992 | Chan |
| 5,187,229 A | 2/1993 | Yamamoto et al. |
| 5,234,965 A | 8/1993 | Gott et al. |
| 5,242,953 A | 9/1993 | Madaj et al. |
| 5,242,978 A | 9/1993 | Schäfer et al. |
| 5,288,804 A | 2/1994 | Kim et al. |
| 5,312,962 A | 5/1994 | Schäfer et al. |
| 5,332,785 A | 7/1994 | Brindoepke |
| 5,340,888 A | 8/1994 | Lemon et al. |
| 5,368,806 A | 11/1994 | Harasin et al. |
| 5,391,624 A | 2/1995 | Rasoul et al. |
| 5,451,653 A | 9/1995 | Chen et al. |
| 5,482,979 A | 1/1996 | Sanders et al. |
| 5,498,659 A | 3/1996 | Esser |
| 5,536,784 A | 7/1996 | Mao et al. |
| 5,605,722 A | 2/1997 | Esser |
| 5,605,952 A | 2/1997 | Esser |
| 5,605,953 A | 2/1997 | Esser |
| 5,609,965 A | 3/1997 | Esser |
| 5,712,363 A | 1/1998 | Noomen et al. |
| 5,952,407 A | 9/1999 | Rasoul et al. |
| 5,952,443 A | 9/1999 | Wilt et al. |
| 6,005,146 A | 12/1999 | Atkins et al. |
| 6,054,535 A | 4/2000 | Wilt et al. |
| 6,057,001 A | 5/2000 | Schoonderwoerd et al. |
| 6,107,451 A | 8/2000 | Fischer et al. |
| 6,121,404 A | 9/2000 | Liles |
| 6,203,607 B1 | 3/2001 | Schoonderwoerd et al. |
| 6,297,320 B1 | 10/2001 | Tang et al. |
| 6,305,691 B1 | 10/2001 | Fuse |

(Continued)

FOREIGN PATENT DOCUMENTS

| | | |
|---|---|---|
| DE | 3134592 | 3/1983 |
| EP | 0199087 | 10/1986 |
| EP | 0358358 | 3/1990 |
| EP | 483583 | 5/1992 |
| EP | 0522396 | 1/1993 |

(Continued)

OTHER PUBLICATIONS

Didukh et al., "Bovine serum albumin complexation with some polyampholy-tes," Advanced Macromolecular and Supramolecular Materials and Processes, 2003, pp. 265-275.

(Continued)

*Primary Examiner* — Irina S Zemel
(74) *Attorney, Agent, or Firm* — Thomas R. Kingsbury; Arthur M. Reginelli

(57) ABSTRACT

Foam compositions are provided. The compositions are prepared from multi-functional acetoacetate esters and multi-functional amines or acrylates. The foam compositions can include one or more additives. The foam compositions can be used for home and commercial insulation, air sealing, sound proofing, structural improvement, and exterior roofing, among other applications. The foam compositions provide advantages of being isocyanate free and offer reduced exposure to isocyanate.

6 Claims, No Drawings

(56) References Cited

U.S. PATENT DOCUMENTS

| | | |
|---|---|---|
| 6,365,673 B1 | 4/2002 | Corcoran et al. |
| 6,387,519 B1 | 5/2002 | Anderson et al. |
| 6,399,742 B1 | 6/2002 | Strukelj |
| 6,432,484 B1 | 8/2002 | Corcoran et al. |
| 6,479,151 B2 | 11/2002 | Buter et al. |
| 6,576,297 B1 | 6/2003 | Cameron et al. |
| 6,590,057 B1 | 7/2003 | Brecht et al. |
| 6,593,417 B1 | 7/2003 | Anderson et al. |
| 6,605,688 B2 | 8/2003 | Strukelj |
| 6,610,777 B1 | 8/2003 | Anderson et al. |
| 6,623,791 B2 | 9/2003 | Sadvary et al. |
| 6,635,341 B1 | 10/2003 | Barancyk et al. |
| 6,657,001 B1 | 12/2003 | Anderson et al. |
| 6,660,782 B1 | 12/2003 | Matijega |
| 6,689,423 B1 | 2/2004 | Schoonderwoerd et al. |
| 6,699,916 B2 | 3/2004 | Lekovic et al. |
| 6,727,292 B2 | 4/2004 | Lockwood |
| 6,759,478 B2 | 7/2004 | Anderson et al. |
| 6,764,986 B1 | 7/2004 | Busch et al. |
| 6,765,056 B2 | 7/2004 | Hobel et al. |
| 6,765,080 B2 | 7/2004 | Super et al. |
| 6,803,390 B2 | 10/2004 | Lekovic et al. |
| 6,803,408 B2 | 10/2004 | Anderson et al. |
| 6,972,276 B1 | 12/2005 | Besselievre et al. |
| 6,987,144 B2 | 1/2006 | Anderson et al. |
| 6,991,185 B2 | 1/2006 | Brown |
| 7,005,472 B2 | 2/2006 | Anderson et al. |
| 7,053,149 B2 | 5/2006 | Anderson et al. |
| 7,112,621 B2 | 9/2006 | Rohrbaugh et al. |
| 7,172,809 B2 | 2/2007 | Barancyk et al. |
| 7,208,145 B2 | 4/2007 | McManus et al. |
| 7,214,725 B2 | 5/2007 | Narayan-Sarathy et al. |
| 7,473,734 B2 | 1/2009 | Beckley et al. |
| 7,504,441 B2 | 3/2009 | Narayan-Sarathy et al. |
| 7,514,528 B2 | 4/2009 | Kauffman et al. |
| 7,714,030 B2 | 5/2010 | Lekovic et al. |
| 7,919,540 B2 | 4/2011 | Heuts et al. |
| 7,973,120 B2 | 7/2011 | Herzig |
| 8,217,092 B2 | 7/2012 | Reinheimer |
| 8,372,892 B2 | 2/2013 | Lekovic et al. |
| 8,568,104 B2 | 10/2013 | McCormick et al. |
| 8,604,091 B2 | 12/2013 | Olang |
| 2001/0056137 A1 | 12/2001 | Buter et al. |
| 2002/0040093 A1 | 4/2002 | Hobel et al. |
| 2002/0086168 A1 | 7/2002 | Sadvary et al. |
| 2002/0123607 A1 | 9/2002 | Strukelj |
| 2003/0207985 A1 | 11/2003 | Anderson et al. |
| 2003/0212199 A1 | 11/2003 | Anderson et al. |
| 2003/0229195 A1 | 12/2003 | Super et al. |
| 2004/0044165 A1 | 3/2004 | Barancyk et al. |
| 2004/0109992 A1 | 6/2004 | Gribble et al. |
| 2004/0110895 A1 | 6/2004 | Anderson et al. |
| 2004/0176529 A1 | 9/2004 | Anderson et al. |
| 2004/0225057 A1 | 11/2004 | Anderson et al. |
| 2005/0031576 A1 | 2/2005 | McManus et al. |
| 2005/0081994 A1 | 4/2005 | Beckley et al. |
| 2005/0176839 A1 | 8/2005 | Lekovic et al. |
| 2005/0245630 A1 | 11/2005 | Narayan-Sarathy et al. |
| 2005/0255048 A1 | 11/2005 | Hirsh et al. |
| 2005/0261391 A1 | 11/2005 | Narayan-Sarathy et al. |
| 2006/0069234 A1 | 3/2006 | Kauffman et al. |
| 2006/0078742 A1 | 4/2006 | Kauffman et al. |
| 2006/0247374 A1 | 11/2006 | Beckley et al. |
| 2007/0173602 A1 | 7/2007 | Brinkman et al. |
| 2008/0039543 A1 | 2/2008 | Narayan-Sarathy et al. |
| 2008/0125504 A1 | 5/2008 | Reinheimer |
| 2008/0132596 A1 | 6/2008 | Heuts et al. |
| 2008/0281006 A1 | 11/2008 | O;Leary et al. |
| 2008/0287571 A1 | 11/2008 | Lundquist et al. |
| 2008/0312398 A1 | 12/2008 | Herzig |
| 2009/0093560 A1 | 4/2009 | Van Rheenen et al. |
| 2009/0324924 A1 | 12/2009 | Romes et al. |
| 2009/0326088 A1 | 12/2009 | DiLoreto |
| 2011/0082264 A1 | 4/2011 | Selifonov et al. |
| 2011/0123717 A1 | 5/2011 | O'Leary |
| 2011/0300359 A1 | 12/2011 | Blanchard et al. |
| 2012/0059076 A1 | 3/2012 | Olang |
| 2012/0208963 A1 | 8/2012 | Van Rheenen et al. |
| 2012/0244095 A1 | 9/2012 | Konradi et al. |
| 2013/0036939 A1 | 2/2013 | Webster et al. |
| 2013/0053564 A1 | 2/2013 | Selifonov et al. |
| 2013/0178550 A1 | 7/2013 | Aou et al. |
| 2013/0241098 A1 | 9/2013 | Anjum et al. |
| 2014/0343182 A1 | 11/2014 | Jin et al. |

FOREIGN PATENT DOCUMENTS

| | | |
|---|---|---|
| EP | 0555774 | 8/1993 |
| EP | 0687716 | 12/1995 |
| EP | 0705855 | 4/1996 |
| EP | 1067116 | 1/2001 |
| EP | 0629607 | 10/2001 |
| EP | 1280842 | 11/2005 |
| EP | 1647588 | 4/2006 |
| EP | 1889868 | 2/2008 |
| EP | 2045290 | 5/2010 |
| GB | 1016761 | 1/1966 |
| GB | 1131374 | 10/1968 |
| JP | 2189320 | 7/1990 |
| JP | 07268272 | 10/1995 |
| JP | 07268273 | 10/1995 |
| JP | 2000265195 | 9/2000 |
| JP | 2006225438 | 8/2006 |
| JP | 2013237815 | 11/2013 |
| KR | 100892236 | 4/2009 |
| WO | WO 1996/37562 | 11/1996 |
| WO | WO 1999/006471 | 2/1999 |
| WO | WO 1999/016811 | 4/1999 |
| WO | WO 2001/77202 | 10/2001 |
| WO | WO 2002/14399 | 2/2002 |
| WO | WO 2002/064877 | 8/2002 |
| WO | WO 2005/090039 | 9/2005 |
| WO | WO 2005/104694 | 11/2005 |
| WO | WO 2005/111130 | 11/2005 |
| WO | WO 2005/115336 | 12/2005 |
| WO | WO 2008/141187 | 11/2008 |
| WO | WO 2011/003981 | 1/2011 |
| WO | WO 2012/006282 | 1/2012 |
| WO | WO 2012/030936 | 3/2012 |
| WO | WO 2012/030941 | 3/2012 |
| WO | WO 2012/100140 | 7/2012 |
| WO | WO 2012/127009 | 9/2012 |
| WO | WO 2012/138755 | 10/2012 |
| WO | WO 2013/100997 | 7/2013 |
| WO | WO 2013/101682 | 7/2013 |
| WO | WO 2013/117458 | 8/2013 |
| WO | WO 2014/016344 | 1/2014 |
| WO | WO 2014/016346 | 1/2014 |
| WO | WO 2014/052081 | 4/2014 |

OTHER PUBLICATIONS

Nikonova et al., "Stability of polyol compositions for preparation of rigid polyurethane foams," Plasticheskie Massy, 1990, 11, pp. 58-61.

Sandhu et al., "Metal chelates with Schiff bases. I. Cobalt (II), nickel (II), copper (II), zinc (II), and cadmium (II) complexes with ethyl 3-[(o-arsonophenyl) imino] butyrate and N-(1-methyl-3-oxobutylidene)-o-arsanilic acid," Indian Journal of Chemistry, 1974, 12(8), pp. 830-833.

Werner et al.., "Preparation of reactive hard foam," Angewandte Makromolekulare Chemie, 1969, 9, pp. 96-105.

Zhumadmova et al., "Interpolymer complexes of novel linear and crosslinked acrylic acid-Schiff base copolymers," Polymer International, 2003, 52(6), pp. 876-882.

International Search Report and Written Opinion for Application No. PCT/US2015/26923 dated Jul. 9, 2015 (15 pages).

STIC structure search, Oct. 23, 2015.

* cited by examiner

FOAM COMPOSITIONS

CROSS-REFERENCE TO RELATED APPLICATIONS

This is a continuation of U.S. patent application Ser. No. 14/692,467, filed on Apr. 21, 2015, which claims priority to U.S. Provisional Patent Application No. 61/982,142, filed on Apr. 21, 2014, the entire contents of all of which are fully incorporated herein by reference.

TECHNICAL FIELD

The present disclosure relates generally to polymeric foam compositions, methods of using the compositions, and processes for preparing the compositions.

BACKGROUND

Most current spray foam insulation liquid compositions are based on two components, a polyol component and an isocyanate component that are separate until the time of application. The isocyanate is typically composed of methylene diphenyl diisocyanate (MDI), which when aerosolized exists as very fine airborne droplets. Exposure to aerosolized MDI can pose a severe health threat (e.g., allergic sensitization). Accordingly, there exists a need for spray foams that eliminate the use of MDI and provide systems safer to the applicator and to nearby personnel.

SUMMARY

In one aspect, disclosed is foam comprising the reaction product of a compound of formula (a) with a compound of formula (b); or the reaction product of a compound of formula (a) with a compound of formula (c);

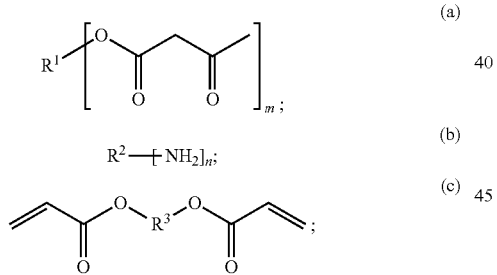

wherein $R^1$, $R^2$, and $R^3$, at each occurrence, are each independently selected from a saturated or unsaturated, linear, branched, or cyclic hydrocarbon group, wherein each hydrocarbon group optionally includes one or more heteroatoms; an aromatic group; a heteroaromatic group; and a heterocyclic group; or any combination thereof wherein said groups, at each occurrence, are independently unsubstituted or substituted with one or more suitable substituents; m is 2 to 200; and n is 2 to 200.

In another aspect, disclosed are methods of preparing the foam compositions.

In another aspect, disclosed are methods of using the foam compositions.

DETAILED DESCRIPTION

Disclosed are rigid and semi-rigid foam compositions, methods of making the compositions, and methods of using the compositions. The compositions are particularly useful for insulation applications (e.g., home and commercial use), air sealing, sound proofing, structural improvement, and exterior roofing, for example. The foam compositions can be applied via a two-part system (a plural component spray system), where the reactants are mixed at a 0.5-1.0:0.5-1.0 by volume basis (e.g., 0.5:1, 1:1, or 1:0.5 by volume basis). The foam compositions can be "open cell foams," "closed cell foams," or a combination thereof.

The disclosed foam compositions provide several advantages. As one advantage, the compositions contain no isocyanate containing compounds, and consequently, the hazards associated with aerosolized isocyanate are eliminated. As another advantage, the foam compositions can be biocompatible. For example, the compositions can be derived from biocompatible monosaccharides, disaccharides, oligosaccharides, polysaccharides, and glycerine materials. As another advantage, the foam compositions may provide for in situ generation of blowing agent, eliminating the need for additional blowing agents to produce the foam. For example, the compositions can be derived from components that yield water upon reaction, and the water may act as a chemical blowing agent. Use of water as a blowing agent can provide rigid or semi-rigid foams.

In one aspect, the foams are provided by reaction of multi-functional acetoacetate esters with multi-functional amines. The acetoacetate esters can be disposed upon any selected substrate (e.g., a hydrocarbon chain, a monosaccharide, a disaccharide, a backbone polymer). The multi-functional amine can be, for example, an alkyldiamine, an aromatic diamine, or an amine-functionalized polymer. Reaction of the acetoacetate ester with the amine results in formation of an imine function (or its enamine tautomer), thereby linking the monomer units. The multi-functionality of the monomers and reaction thereof provides for a cross-linked polymeric structure, exemplified as a rigid or semi-rigid foam.

In another aspect, the foams are provided by a Michael addition reaction between multi-functional acetoacetate esters and diacrylate compounds. Reaction of the multiple functionalities of the monomer starting materials provides for a cross-linked polymeric structure, exemplified as a rigid or semi-rigid foam.

1. Definition of Terms

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The conjunctive term "or" includes any and all combinations of one or more listed elements associated by the conjunctive term. For example, the phrase "an apparatus comprising A or B" may refer to an apparatus including A where B is not present, an apparatus including B where A is not present, or an apparatus where both A and B are present. The phrases "at least one of A, B, . . . and N" or "at least one of A, B, . . . N, or combinations thereof" are defined in the broadest sense to mean one or more elements selected from the group comprising A, B, . . . and N, that is to say, any combination of one or more of the elements A, B, . . . or N including any one element alone or in combination with one or more of the other elements which may also include, in combination, additional elements not listed.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

As used herein, the term "suitable substituent" is intended to mean a chemically acceptable functional group (i.e., a moiety that does not negate the activity of the disclosed foam compositions). Illustrative examples of suitable substituents include, but are not limited to, halo groups, perfluoroalkyl groups, perfluoroalkoxy groups, alkyl groups, alkenyl groups, alkynyl groups, hydroxy groups, oxo groups, mercapto groups, alkylthio groups, alkoxy groups, aryl or heteroaryl groups, aryloxy or heteroaryloxy groups, aralkyl or heteroaralkyl groups, aralkoxy or heteroaralkoxy groups, HO—(C=O)— groups, heterocylic groups, cycloalkyl groups, amino groups, alkyl- and dialkylamino groups, carbamoyl groups, alkylcarbonyl groups, alkoxycarbonyl groups, alkylaminocarbonyl groups, dialkylamino carbonyl groups, arylcarbonyl groups, aryloxycarbonyl groups, alkylsulfonyl groups, arylsulfonyl groups and the like. Those skilled in the art will appreciate that many substituents can be substituted by additional substituents.

As used herein, the term "alkenyl" refers a straight or branched hydrocarbon chain containing from 2 to 10 carbons and containing at least one carbon-carbon double bond formed by the removal of two hydrogens. Representative examples of alkenyl include, but are not limited to, ethenyl, 2-propenyl, 2-methyl-2-propenyl, 3-butenyl, 4-pentenyl, 5-hexenyl, 2-heptenyl, 2-methyl-1-heptenyl, and 3-decenyl. Alkenyl groups may be unsubstituted or substituted by one or more suitable substituents, preferably 1 to 3 suitable substituents, as defined above.

As used herein, the term "alkoxy" refers to an alkyl group, as defined herein, appended to the parent molecular moiety through an oxygen atom. Representative examples of alkoxy include, but are not limited to, methoxy, ethoxy, propoxy, 2-propoxy, butoxy, tert-butoxy, pentyloxy, and hexyloxy.

As used herein, the term "alkyl" refers to a linear or branched hydrocarbon radical having the specified number of carbon atoms. The term "$C_1$-$C_6$-alkyl" is defined to include alkyl groups having 1, 2, 3, 4, 5, or 6 carbons in a linear or branched arrangement. For example, "$C_1$-$C_6$-alkyl" specifically includes methyl, ethyl, n-propyl, i-propyl, n-butyl, t-butyl, i-butyl, pentyl, and hexyl. Alkyl groups may be unsubstituted or substituted by one or more suitable substituents, preferably 1 to 3 suitable substituents, as defined above.

As used herein, the term "alkynyl" refers to a straight or branched hydrocarbon radical having 2, 3, 4, 5, 6, 7, 8, 9 or 10 carbons, and having one or more carbon-carbon triple bonds. Alkynyl groups include, but are not limited to, ethynyl, propynyl, and butynyl. Alkynyl groups may be unsubstituted or substituted by one or more suitable substituents, preferably 1 to 3 suitable substituents, as defined above.

As used herein, the term "amino" refers to an —$NH_2$ group.

As used herein, the term "aminoalkyl" refers to at least one amino group, as defined herein, appended to the parent molecular moiety through an alkyl group, as defined herein. Representative examples of aminoalkyl include, but are not limited to, aminomethyl, 2-aminoethyl, and 2-aminopropyl.

As used herein, the term "aryl" means monocyclic, bicyclic, or tricyclic aromatic radicals. Representative examples of the aryl groups include, but are not limited to, phenyl, dihydroindenyl, indenyl, naphthyl, dihydronaphthalenyl, and tetrahydronaphthalenyl. Aryl groups may be optionally substituted by one or more suitable substituents, preferably 1 to 5 suitable substituents, as defined above.

As used herein, the term "carbonyl" or "(C=O)" (as used in phrases such as alkylcarbonyl, alkyl —(C=O)— or alkoxycarbonyl) refers to the joinder of the >C=O moiety to a second moiety such as an alkyl or amino group (i.e. an amido group). Alkoxycarbonylamino (i.e. alkoxy(C=O)—NH—) refers to an alkyl carbamate group. The carbonyl group is also equivalently defined herein as (C=O). Alkylcarbonylamino refers to groups such as acetamide.

As used herein, the term "cycloalkyl" refers to a mono, bicyclic or tricyclic carbocyclic radical (e.g., cyclopropyl, cyclobutyl, cyclopentyl, cyclohexyl, cycloheptyl, cyclooctyl, cyclononyl, cyclopentenyl, cyclohexenyl, bicyclo[2.2.1]heptanyl, bicyclo[3.2.1]octanyl and bicyclo[5.2.0]nonanyl, etc.); optionally containing 1 or 2 double bonds. Cycloalkyl groups may be unsubstituted or substituted by one or more suitable substituents, preferably 1 to 5 suitable substituents, as defined above.

As used herein, the term "halogen" or "halo" refers to a fluoro, chloro, bromo or iodo radical.

As used herein, the term "haloalkyl" refers to an alkyl group, as defined herein, substituted by one, two, three, or four halogen atoms. Representative examples of haloalkyl include, but are not limited to, chloromethyl, 2-fluoroethyl, trifluoromethyl, pentafluoroethyl, 2-chloro-3-fluoropentyl, and 4,4,4,-trifluorobutyl.

As used herein, the term "heteroaryl" refers to a monocyclic heteroaryl or a bicyclic heteroaryl. The monocyclic heteroaryl is a five- or six-membered ring. The five-membered ring contains two double bonds. The five-membered ring may contain one heteroatom selected from O or S; or one, two, three, or four nitrogen atoms and optionally one oxygen or sulfur atom. The six-membered ring contains three double bonds and one, two, three or four nitrogen atoms. Representative examples of monocyclic heteroaryl include, but are not limited to, furanyl, imidazolyl, isoxazolyl, isothiazolyl, oxadiazolyl, 1,3-oxazolyl, pyridinyl, pyridazinyl, pyrimidinyl, pyrazinyl, pyrazolyl, pyrrolyl, tetrazolyl, thiadiazolyl, 1,3-thiazolyl, thienyl, triazolyl, and triazinyl. The bicyclic heteroaryl includes a monocyclic heteroaryl fused to a phenyl, or a monocyclic heteroaryl fused to a monocyclic cycloalkyl, or a monocyclic heteroaryl fused to a monocyclic cycloalkenyl, or a monocyclic heteroaryl fused to a monocyclic heteroaryl, or a monocyclic heteroaryl fused to a monocyclic heterocycle. Representative examples of bicyclic heteroaryl groups include, but are not limited to, benzofuranyl, benzothienyl, benzoxazolyl, benzimidazolyl, benzoxadiazolyl, 6,7-dihydro-1,3-benzothiazolyl, imidazo[1,2-a]pyridinyl, indazolyl, indolyl, isoindolyl, isoquinolinyl, naphthyridinyl, pyridoimidazolyl, quinazolinyl, quinolinyl, thiazolo[5,4-b]pyridin-2-yl, thiazolo[5,4-d]pyrimidin-2-yl, and 5,6,7,8-tetrahydroquinolin-5-yl. Heteroaryl groups may be unsubstituted or substituted by one or more suitable substituents, preferably 1 to 5 suitable substituents, as defined above.

As used herein, the term "heterocycle" or "heterocyclyl" refers to a monocyclic heterocycle, a bicyclic heterocycle, or a tricyclic heterocycle. The monocyclic heterocycle is a three-, four-, five-, six-, seven-, or eight-membered ring containing at least one heteroatom independently selected from the group consisting of oxygen, nitrogen, phosphorus and sulfur. The three- or four-membered ring contains zero or one double bond, and one heteroatom selected from the group consisting of oxygen, nitrogen, phosphorus and sulfur. The five-membered ring contains zero or one double bond and one, two or three heteroatoms selected from the group consisting of oxygen, nitrogen, phosphorus and sulfur. The six-membered ring contains zero, one or two double bonds and one, two, or three heteroatoms selected from the group consisting of oxygen, nitrogen, phosphorus and sulfur. The seven- and eight-membered rings contains zero, one, two, or three double bonds and one, two, or three heteroatoms selected from the group consisting of oxygen, nitrogen, phosphorus and sulfur. Representative examples of monocyclic heterocycles include, but are not limited to, azetidinyl, azepanyl, aziridinyl, diazepanyl, 1,3-dioxanyl, 1,3-dioxolanyl, 1,3-dithiolanyl, 1,3-dithianyl, imidazolinyl, imidazolidinyl, isothiazolinyl, isothiazolidinyl, isoxazolinyl, isoxazolidinyl, morpholinyl, oxadiazolinyl, oxadiazolidinyl, oxazolinyl, oxazolidinyl, phosphinane, piperazinyl, piperidinyl, pyranyl, pyrazolinyl, pyrazolidinyl, pyrrolinyl, pyrrolidinyl, tetrahydrofuranyl, tetrahydropyranyl, tetrahydropyridinyl, tetrahydropyrimidinyl, tetrahydrothienyl, thiadiazolinyl, thiadiazolidinyl, thiazolinyl, thiazolidinyl, thiomorpholinyl, 1,1-dioxidothiomorpholinyl (thiomorpholine sulfone), thiopyranyl, and trithianyl. The bicyclic heterocycle is a monocyclic heterocycle fused to a phenyl group, or a monocyclic heterocycle fused to a monocyclic cycloalkyl, or a monocyclic heterocycle fused to a monocyclic cycloalkenyl, or a monocyclic heterocycle fused to a monocyclic heterocycle, or a bridged monocyclic heterocycle ring system in which two non-adjacent atoms of the ring are linked by an alkylene bridge of 1, 2, 3, or 4 carbon atoms, or an alkenylene bridge of two, three, or four carbon atoms. Representative examples of bicyclic heterocycles include, but are not limited to, benzopyranyl, benzothiopyranyl, chromanyl, 2,3-dihydrobenzofuranyl, 2,3-dihydrobenzothienyl, azabicyclo[2.2.1]heptyl (including 2-azabicyclo[2.2.1]hept-2-yl), 2,3-dihydro-1H-indolyl, isoindolinyl, octahydrocyclopenta[c]pyrrolyl, octahydropyrrolopyridinyl, 9-phosphabicyclo[3.3.1]nonane, 8-phosphabicyclo[3.2.1]octane, and tetrahydroisoquinolinyl. Tricyclic heterocycles are exemplified by a bicyclic heterocycle fused to a phenyl group, or a bicyclic heterocycle fused to a monocyclic cycloalkyl, or a bicyclic heterocycle fused to a monocyclic cycloalkenyl, or a bicyclic heterocycle fused to a monocyclic heterocycle, or a bicyclic heterocycle in which two non-adjacent atoms of the bicyclic ring are linked by an alkylene bridge of 1, 2, 3, or 4 carbon atoms, or an alkenylene bridge of two, three, or four carbon atoms. Examples of tricyclic heterocycles include, but are not limited to, octahydro-2,5-epoxypentalene, hexahydro-2H-2,5-methanocyclopenta[b]furan, hexahydro-1H-1,4-methanocyclopenta[c]furan, aza-admantane (1-azatricyclo[3.3.1.1$^{3,7}$]decane), oxa-adamantane (2-oxatricyclo[3.3.1.1$^{3,7}$]decane), and 2,4,6-trioxa-8-phosphatricyclo[3.3.1.13,7]decane. Heterocyclic groups may be unsubstituted or substituted by one or more suitable substituents, preferably 1 to 3 suitable substituents, as defined above.

As used herein, the term "hydroxy" refers to an —OH group.

As used herein, the term "hydroxyalkyl" refers to an alkyl group, as defined herein, substituted by at least one hydroxy group. Representative examples of hydroxyalkyl include, but are not limited to, hydroxymethyl, 2-hydroxyethyl, 3-hydroxypropyl, 2,3-dihydroxypropyl, 2,3-dihydroxypentyl, 4-hydroxybutyl, 2-ethyl-4-hydroxyheptyl, 3,4-dihydroxybutyl, and 5-hydroxypentyl.

A prefix attached to a multi-component substituent only applies to the first component it precedes. To illustrate, the term "alkylcycloalkyl" contains two components: alkyl and cycloalkyl. Thus, the $C_1$-$C_6$-prefix on $C_1$-$C_6$-alkylcycloalkyl means that the alkyl component of the alkylcycloalkyl contains from 1 to 6 carbon atoms; the $C_1$-$C_6$-prefix does not describe the cycloalkyl component. To illustrate further, the prefix "halo" on haloalkoxyalkyl indicates that only the alkoxy component of the alkoxyalkyl substituent is substituted with one or more halogen radicals. If the halogen substitution may only occur on the alkyl component, the substituent would instead be described as "alkoxyhaloalkyl."

A substituent is "substitutable" if it comprises at least one carbon or nitrogen atom that is bonded to one or more hydrogen atoms. Thus, for example, hydrogen, halogen, and cyano do not fall within this definition. In addition, a sulfur atom in a heterocyclyl containing such atom is substitutable with one or two oxo substituents.

If a substituent is described as being "substituted", a non-hydrogen radical is in the place of hydrogen radical on a carbon or nitrogen of the substituent. Thus, for example, a substituted alkyl substituent is an alkyl substituent in which at least one non-hydrogen radical is in the place of a hydrogen radical on the alkyl substituent. To illustrate, monofluoroalkyl is alkyl substituted with a fluoro radical, and difluoroalkyl is alkyl substituted with two fluoro radicals. It should be recognized that if there is more than one substitution on a substituent, each non-hydrogen radical may be identical or different (unless otherwise stated).

When a substituent is referred to as "unsubstituted" or not referred to as "substituted" or "optionally substituted", it means that the substituent does not have any substituents. If a substituent is described as being "optionally substituted", the substituent may be either (1) not substituted or (2) substituted. If a substituent is described as being optionally substituted with up to a particular number of non-hydrogen radicals, that substituent may be either (1) not substituted; or (2) substituted by up to that particular number of non-hydrogen radicals or by up to the maximum number of substitutable positions on the substituent, whichever is less. Thus, for example, if a substituent is described as a heteroaryl optionally substituted with up to 3 non-hydrogen radicals, then any heteroaryl with less than 3 substitutable positions would be optionally substituted by up to only as many non-hydrogen radicals as the heteroaryl has substitutable positions. To illustrate, tetrazolyl (which has only one substitutable position) would be optionally substituted with up to one non-hydrogen radical. To illustrate further, if an amino nitrogen is described as being optionally substituted with up to 2 non-hydrogen radicals, then a primary amino nitrogen will be optionally substituted with up to 2 non-hydrogen radicals, whereas a secondary amino nitrogen will be optionally substituted with up to only 1 non-hydrogen radical.

If substituents are described as being "independently selected" from a group, each substituent is selected independent of the other. Each substituent, therefore, may be identical to or different from the other substituent(s).

As used herein, the term "open-cell" refers to individual cells that are ruptured or open or interconnected producing a porous "sponge" foam, where the gas phase can move around from cell to cell.

As used herein, the term "closed-cell" refers to individual cells that are discrete, such that each closed-cell is enclosed by polymeric sidewalls that minimize the flow of a gas phase from cell to cell. It should be noted that the gas phase may be dissolved in the polymer phase besides being trapped inside the closed-cell. Furthermore, the gas composition of the closed-cell foam at the moment of manufacture does not necessarily correspond to the equilibrium gas composition after aging or sustained use. Thus, the gas in a closed-cell foam frequently exhibits compositional changes as the foam ages.

2. Foam Compositions

In one aspect, disclosed are foam compositions having repeating units of formula (I),

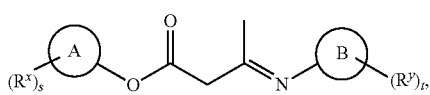

wherein
each $R^x$ represents a group of formula:

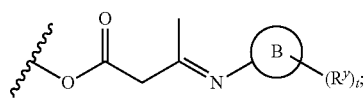

each $R^y$ represents a group of formula:

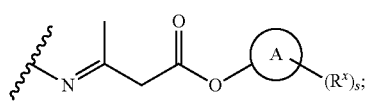

A and B, at each occurrence, are each independently selected from a saturated or unsaturated, linear, branched, or cyclic hydrocarbon group, wherein each hydrocarbon group optionally includes one or more heteroatoms (e.g., oxygen, nitrogen, sulfur, silicon, or phosphorous); an aromatic group; a heteroaromatic group; and a heterocyclic group; or any combination thereof; wherein said groups, at each occurrence, are independently unsubstituted or substituted with one or more suitable substituents; and s and t, at each occurrence, are each independently an integer selected from 1 to 200, preferably 1 to 20.

It is to be understood that the imine functionality (also referred to as a Schiff base) in the repeating units of formula (I) may exist as its enamine tautomer. For example, the repeating units of formula (I) may also be depicted as follows:

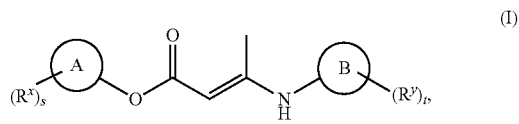

wherein $R^x$, $R^y$, A, B, s, and t are as defined above.

In certain embodiments, A is a $C_1$-$C_{20}$ hydrocarbon group. In certain embodiments, A is a saturated, linear or branched $C_1$-$C_{20}$ hydrocarbon group. In certain embodiments, A is a linear $C_6$ hydrocarbon group. In certain embodiments, A is a linear $C_4$ hydrocarbon group. In certain embodiments, A is a linear $C_3$ hydrocarbon group. In certain embodiments, A is a group of formula:

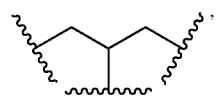

wherein s is 2 at each occurrence.

In certain embodiments, A is a heterocyclic group. In certain embodiments, A is a group of formula:

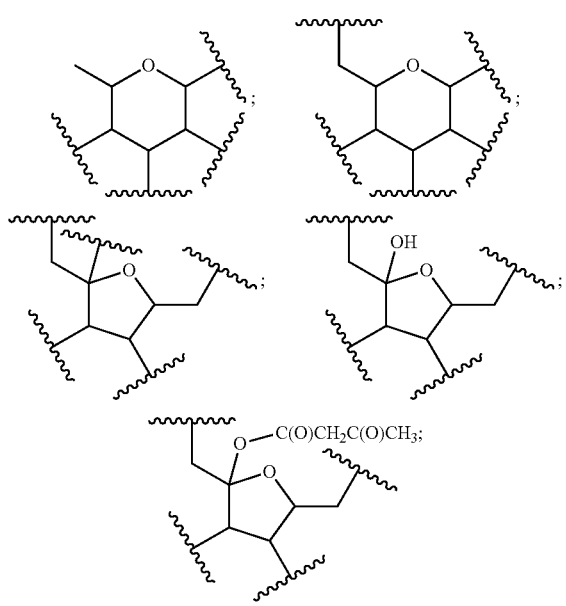

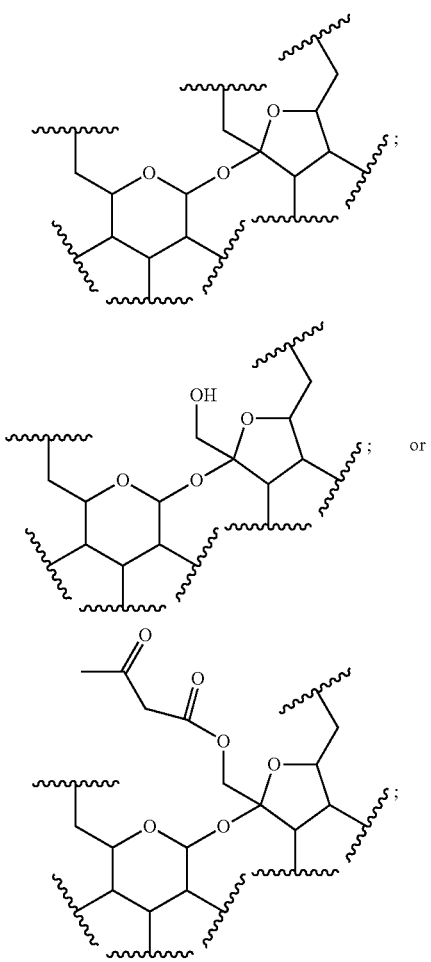

or any combination thereof.

In certain embodiments, each A is independently selected from a linear $C_3$ hydrocarbon group, a linear $C_4$ hydrocarbon group, a linear $C_6$ hydrocarbon group, and a heterocyclic group. In certain embodiments, each A is independently selected from a linear $C_3$ hydrocarbon group and a heterocyclic group. In certain embodiments, each A is a group of formula:

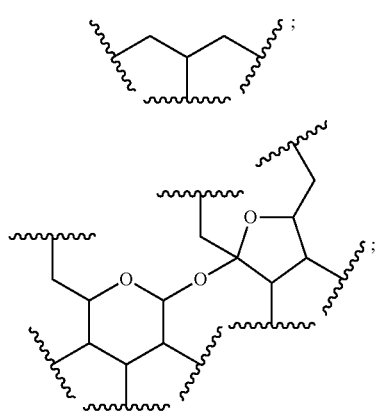

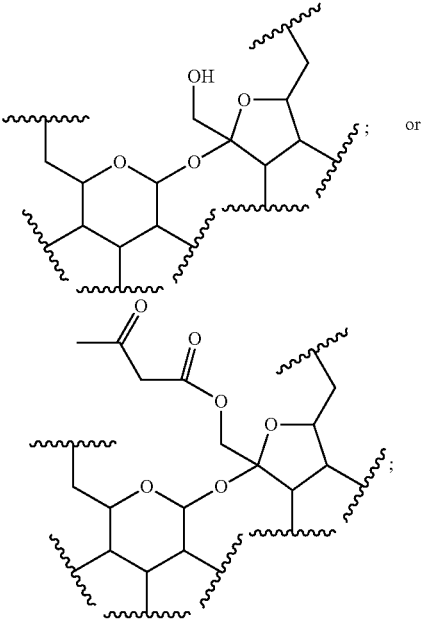

or any combination thereof.

In certain embodiments, each A is derived from a multi-functional acetoacetate ester compound. In certain embodiments, A is derived from hydrocarbon compounds with two or more acetoacetate groups. Suitable multi-functional acetoacetate ester compounds include, for example, alkyl diol diacetoacetates (also known as alkyl diol bisacetoacetates) such as, for example, butane diol diacetoacetate, 1,6-hexanediol diacetoacetate, neopentylglycol diacetoacetate, 4,8-bis(hydroxymethyl)tricyclo[5.2.1.0$^{2,6}$]decane diacetoacetate, 2-methyl-1,3-propanediol diacetoacetate, ethylene glycol diacetoacetate, propylene glycol diacetoacetate; cyclohexanedimethanol diacetoacetate; other diol diacetoacetates; alkyl triol triacetoacetates (also known as alkyl triol trisacetoacetates), such as, for example, trimethylol propane triacetoacetate, pentaerythritol triacetoacetate, glycerol triacetoacetate, or trimethylolethane triacetoacetate; and the like. Further examples of suitable multi-functional acetoacetate ester compounds include tetra-, penta-, and higher acetoacetates of polyhydric alcohols (i.e., polyhydric alcohols on which four, five, or more hydroxyl groups are linked to acetoacetate groups through ester linkages), including, for example, pentaerythritol tetraacetoacetate, dipentaerythritol pentaacetoacetate, and dipentaerythritol hexaacetoacetate. Further examples of suitable multi-functional acetoacetate ester compounds include ethylene glycol bisacetoacetate, 1,2-propanediol bisacetoacetate, 1,3-propanediol bisacetoacetate, 1,4-butanediol bisacetoacetate, neopentyl glycol bisacetoacetate, isosorbide bisacetoacetate, trimethylol propane tris acetoacetate, glycerol tris acetoacetate, castor oil tris acetoacetate, glucose acetoacetates (e.g., glucose tris acetoacetate, and glucose tetra acetoacetate), sucrose acetoacetates, sorbitol acetoacetates (e.g., sorbitol tris acetoacetate, and sorbitol tetra acetoacetate), and erythritol acetoacetates.

In certain embodiments, A is derived from a multi-functional acetoacetate ester of a monosaccharide, a disaccharide, an oligosaccharide, a polysaccharide, or a combination thereof. In certain embodiments, A is derived from a multi-functional acetoacetate ester of glucose, fructose, galactose, sucrose, lactulose, lactose, maltose, trehalose, celloboise, kojibiose, nigerose, isomaltose, β,β-trehalose, α,β-trehalose, sophorose, laminaribiose, gentiobiose, turanose, maltulose, palatinose, gentiobiulose, mannobiose, melibiose, melibiulose, rutinose, rutinulose, xylobiose, fructo-oligosaccharides, galactooligosaccharides, mannan oligosaccharides, arabinoxylans, cellulose, chitin, pectins, or a combination thereof. In certain embodiments, A is derived from a multi-functional acetoacetate ester of sucrose. In certain embodiments, A is derived from a multi-functional acetoacetate ester of sorbitol. In certain embodiments, A is derived from a multi-functional acetoacetate ester of erythritol.

In certain embodiments, B is a $C_1$-$C_{20}$ hydrocarbon group. In certain embodiments, B is a saturated, linear or branched $C_1$-$C_{20}$ hydrocarbon group. In certain embodiments, B is a saturated, linear or branched $C_2$-$C_{10}$ hydrocarbon group. In certain embodiments, B is a group of formula:

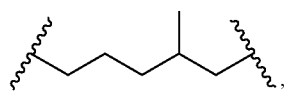

wherein t is 1 at each occurrence.

In certain embodiments, B is arylalkyl, and more specifically, an aryl-dialkyl group. In certain embodiments, B is a group of formula:

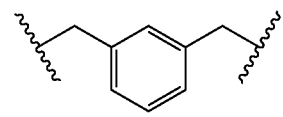

wherein t is 1 at each occurrence.

In certain embodiments, B is a group of formula:

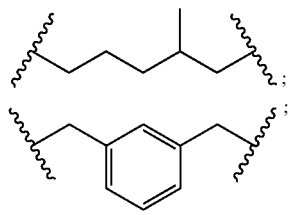

or any combination thereof.

In certain embodiments, B is derived from a multi-functional amine compound. In certain embodiments, B is derived from an alkylene diamine, an alkylene triamine, an alkylene tetraamine, or the like. In certain embodiments, B is derived from an aromatic-containing multi-functional amine. Suitable multi-functional amine compounds include, for example, ethylene diamine, hexamethylene diamine, 2-methyl-1,5-diaminopentane, diethylenetriamine, triethylenetetramine, tetraethylenepentamine, meta-phenylenediamine, para-phenylenediamine, meta-xylenediamine, and diaminodiphenyl sulfone.

In certain embodiments, s, at each occurrence, is independently selected from 2, 3, 4, 5, 6, 7, and 8. In certain embodiments, s is 2 at each occurrence. In certain embodiments, t, at each occurrence, is independently selected from 1, 2, 3, 4, and 5. In certain embodiments, t is 1 at each occurrence.

In certain embodiments, the foam compositions have formula (I-a),

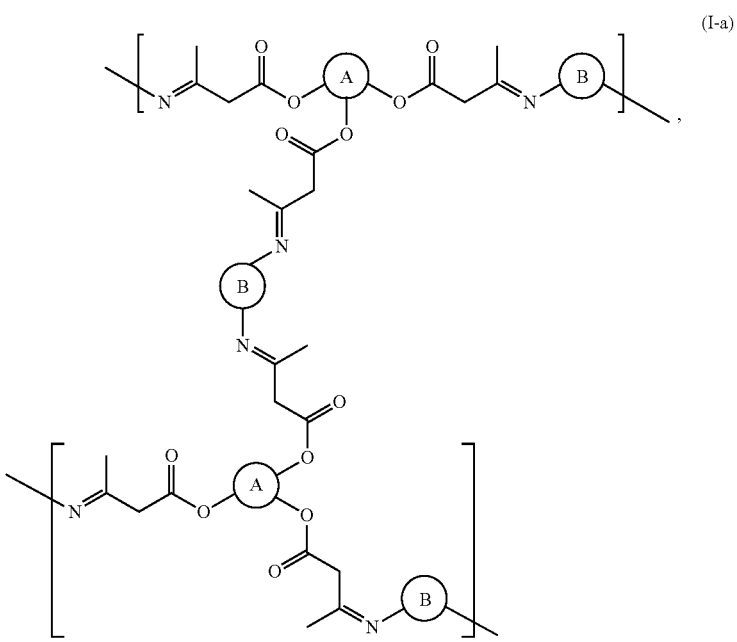

wherein A and B are as defined above.

In certain embodiments, the foam compositions have formula (I-b), (I-b)

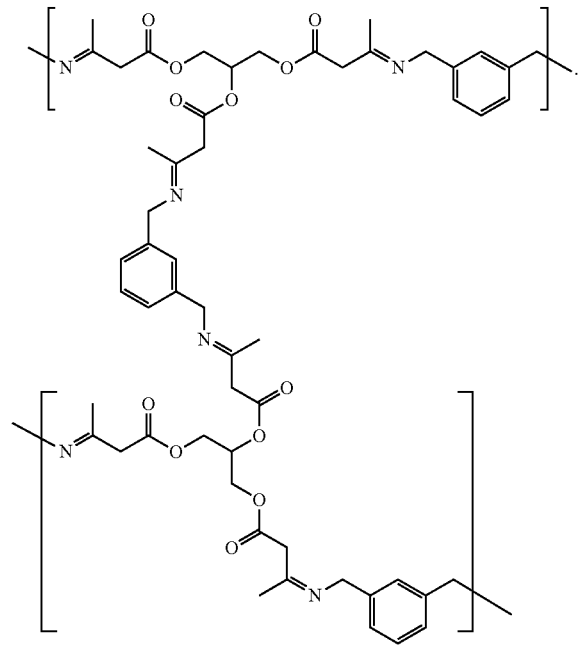

In another aspect, disclosed are foam compositions having repeating units of formula (II), (II)

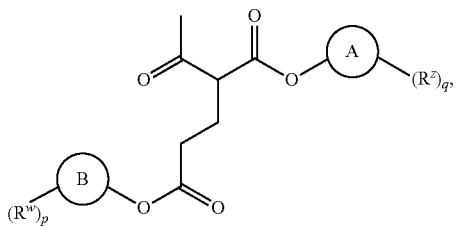

wherein
each $R^w$ represents a group of formula:

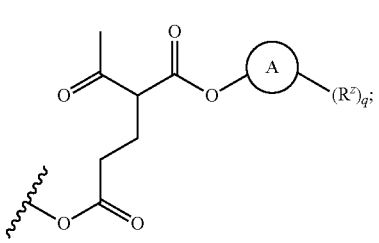

each $R^z$ represents a group of formula:

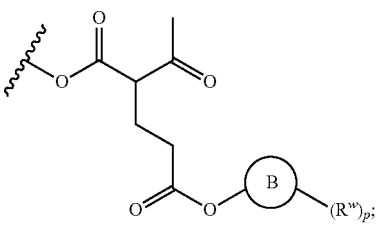

A and B, at each occurrence, are each independently selected from a saturated or unsaturated, linear, branched, or cyclic hydrocarbon group, wherein each hydrocarbon group optionally includes one or more heteroatoms (e.g., oxygen, nitrogen, sulfur, silicon, or phosphorous); an aromatic group; a heteroaromatic group; and a heterocyclic group; or any combination thereof; wherein said groups, at each occurrence, are independently unsubstituted or substituted with one or more suitable substituents; and p and q, at each occurrence, are each independently an integer selected from 1 to 200, preferably 1 to 20.

In certain embodiments, the foam compositions have formula (II-a), (II-a)

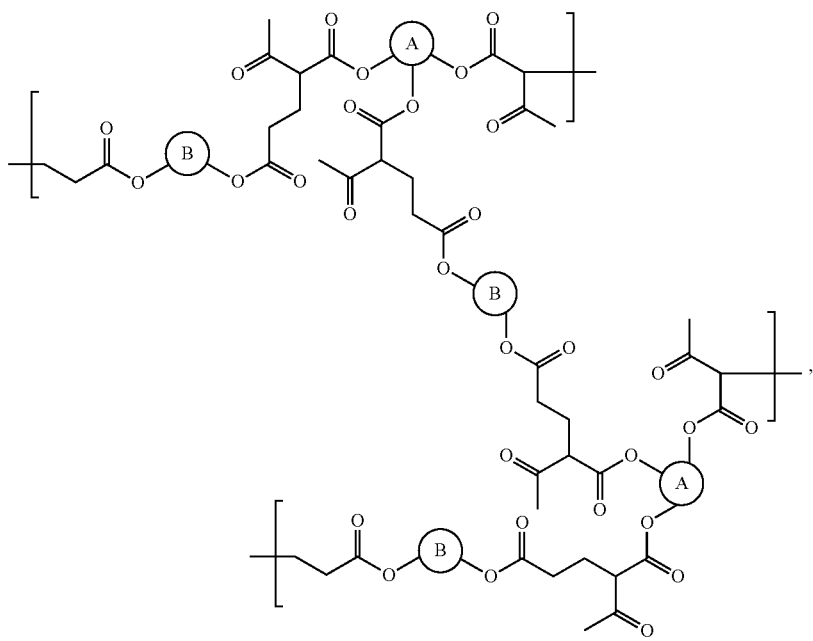

wherein A and B are as defined above.

In certain embodiments, the foam compositions have formula (II-b),

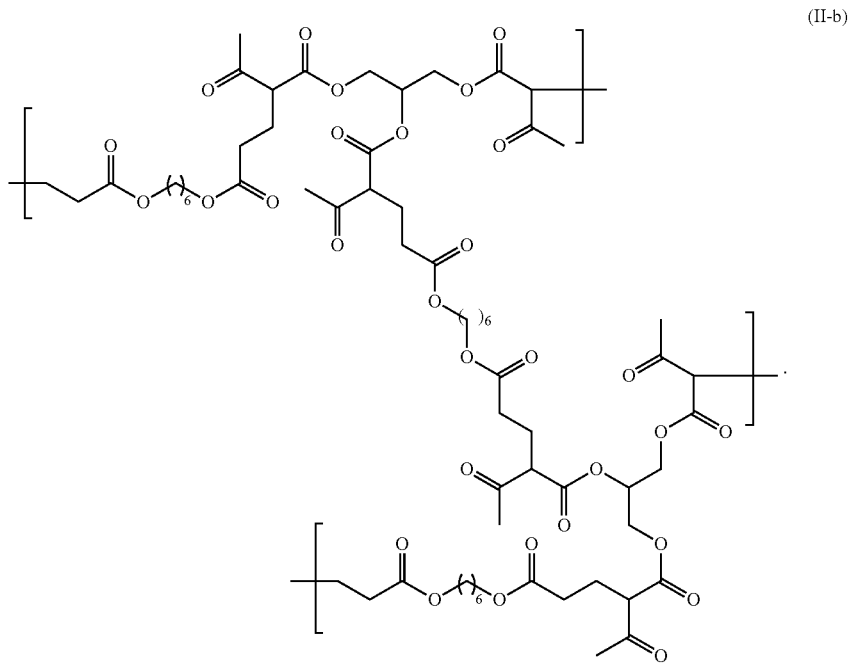

(II-b)

In another aspect, disclosed are foam compositions comprising the reaction product of a compound of formula (a) with a compound of formula (b); or the reaction product of a compound of formula (a) with a compound of formula (c);

(a)

(b)

$R^2\!\!-\!\!\text{[NH}_2\text{]}_n$;

(c)

wherein $R^1$, $R^2$, and $R^3$, at each occurrence, are each independently selected from a saturated or unsaturated, linear, branched, or cyclic hydrocarbon group, wherein each hydrocarbon group optionally includes one or more heteroatoms (e.g., oxygen, nitrogen, sulfur, silicon, or phosphorous); an aromatic group; a heteroaromatic group; and a heterocyclic group; or any combination thereof; wherein said groups, at each occurrence, are independently unsubstituted or substituted with one or more suitable substituents; m is 2 to 200, preferably 2 to 20; and n is 2 to 200, preferably 2 to 20.

In certain embodiments, $R^1$ is a $C_1$-$C_{20}$ hydrocarbon group, wherein m is 2 to 20. In certain embodiments, $R^1$ is a $C_1$-$C_{10}$ hydrocarbon group, wherein m is 2 to 10. In certain embodiments, $R^1$ is a $C_1$-$C_5$ hydrocarbon group, wherein m is 2 to 5. In certain embodiments, $R^1$ is a $C_6$ hydrocarbon group and m is 3 or 4. In certain embodiments, $R^1$ is a $C_4$ hydrocarbon group and m is 2, 3, or 4. In certain embodiments, $R^1$ is a $C_3$ hydrocarbon group and m is 3, wherein the compound of formula (a) is

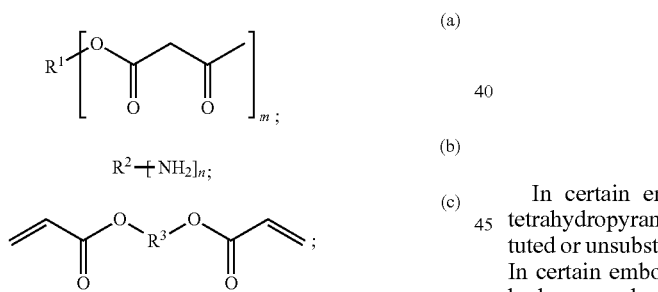

In certain embodiments, $R^1$ is a tetrahydrofuranyl or tetrahydropyranyl group, wherein said groups are substituted or unsubstituted with one or more suitable substituents. In certain embodiments, $R^1$ is a tetrahydrofuranyl or tetrahydropyranyl group, wherein said groups are substituted or unsubstituted with one or more suitable substituents; and m is 4 to 7.

In certain embodiments, $R^1$ is derived from derived from compounds with two or more hydroxyl groups. Suitable multi-functional hydroxy compounds include, for example, diols, triols, and other polyhydric alcohols. In certain embodiments, $R^1$ is a polymer backbone. For example, $R^1$ may be derived from a polyalkylene glycol (e.g., polyethylene glycol, polypropylene glycol), a polysaccharide (e.g., cellulose, starch, amylose, amylopectin, tapioca, dextrin), or a polyvinyl alcohol.

In certain embodiments, the compound of formula (a) is a multi-functional acetoacetate ester compound. Exemplary compounds of formula (a) include, but are not limited to, alkyl diol diacetoacetates (also known as alkyl diol bisacetoacetates) such as, for example, butane diol diacetoacetate, 1,6-hexanediol diacetoacetate, neopentylglycol diacetoacetate, 4,8-bis(hydroxymethyl)tricyclo[5.2.1.0$^{2,6}$]decane diacetoacetate, 2-methyl-1,3-propanediol diacetoacetate, ethylene glycol diacetoacetate, propylene glycol diacetoacetate; cyclohexanedimethanol diacetoacetate; other diol diacetoacetates; alkyl triol triacetoacetates (also known as alkyl triol trisacetoacetates), such as, for example, trimethylol propane triacetoacetate, pentaerythritol triacetoacetate, glycerol triacetoacetate, or trimethylolethane triacetoacetate; and the like. Further examples of suitable multi-functional acetoacetate ester compounds of formula (a) include tetra-, penta-, and higher acetoacetates of polyhydric alcohols (i.e., polyhydric alcohols on which four, five, or more hydroxyl groups are linked to acetoacetate groups through ester linkages), including, for example, pentaerythritol tetraacetoacetate, dipentaerythritol pentaacetoacetate, and dipentaerythritol hexaacetoacetate. Further examples of suitable multi-functional acetoacetate ester compounds of formula (a) include ethylene glycol bisacetoacetate, 1,2-propanediol bisacetoacetate, 1,3-propanediol bisacetoacetate, 1,4-butanediol bisacetoacetate, neopentyl glycol bisacetoacetate, isosorbide bisacetoacetate, trimethylol propane tris acetoacetate, glycerol tris acetoacetate, castor oil tris acetoacetate, glucose acetoacetates (e.g., glucose tris acetoacetate, and glucose tetra acetoacetate), sucrose acetoacetates, sorbitol acetoacetates (e.g., sorbitol tris acetoacetate, and sorbitol tetra acetoacetate), and erythritol acetoacetates.

In certain embodiments, the compound of formula (a) is a multi-functional acetoacetate ester of a monosaccharide, a disaccharide, an oligosaccharide, a polysaccharide, or a combination thereof. In certain embodiments, the compound of formula (a) is derived from glucose, fructose, galactose, sucrose, lactulose, lactose, maltose, trehalose, celloboise, kojibiose, nigerose, isomaltose, β,β-trehalose, α,β-trehalose, sophorose, laminaribiose, gentiobiose, turanose, maltulose, palatinose, gentiobiulose, mannobiose, melibiose, melibiulose, rutinose, rutinulose, xylobiose, fructooligosaccharides, galactooligosaccharides, mannan oligosaccharides, arabinoxylans, cellulose, chitin, pectins, or a combination thereof. In certain embodiments, the compound of formula (a) is derived from sucrose. In certain embodiments, the compound of formula (a) is derived from sorbitol. In certain embodiments, the compound of formula (a) is derived from erythritol.

In certain embodiments, the compound (a) has formula:

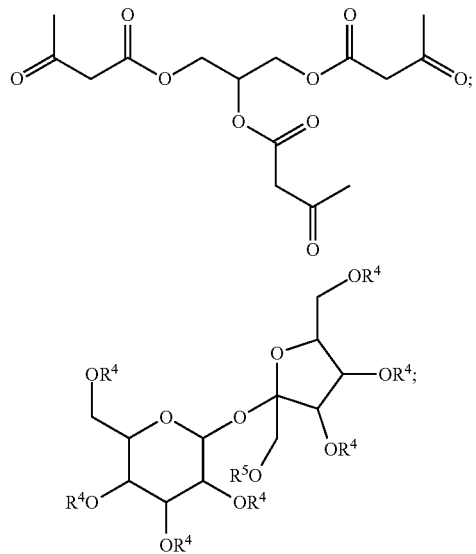

or a combination thereof; wherein $R^4$, at each occurrence, is independently selected from —H and —C(O)CH$_2$C(O)CH$_3$, provided that at least two $R^4$ groups are —C(O)CH$_2$C(O)CH$_3$; and $R^5$ is —H or —C(O)CH$_2$C(O)CH$_3$.

In certain embodiments, $R^2$ is a $C_1$-$C_{20}$ hydrocarbon group, wherein n is 2 to 20. In certain embodiments, $R^2$ is a saturated, linear or branched $C_1$-$C_{20}$ hydrocarbon group, wherein n is 2 to 20. In certain embodiments, $R^2$ is a saturated, linear or branched $C_2$-$C_{10}$ hydrocarbon group, wherein n is 2 to 10. In certain embodiments, $R^2$ is a $C_6$ hydrocarbon group and n is 2, wherein the compound of formula (b) is

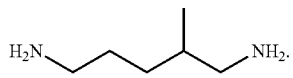

In certain embodiments, $R^2$ is aromatic-containing group. In certain embodiments, $R^2$ is an arylalkyl, and more specifically, an aryldialkyl group. In certain embodiments, $R^2$ is an aryldialkyl group and n is 2, wherein the compound of formula (b) is

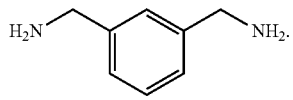

In certain embodiments, the compound of formula (b) is a multi-functional amine compound. In certain embodiments, the compound of formula (b) is an alkylene diamine, an alkylene triamine, an alkylene tetraamine, or the like. In certain embodiments, the compound of formula (b) is an aromatic-containing multi-functional amine. Suitable multi-functional amine compounds include, for example, ethylene diamine, hexamethylene diamine, 2-methyl-1,5-diaminopentane, diethylenetriamine, triethylenetetramine, tetraethylenepentamine, meta-phenylenediamine, para-phenylenediamine, meta-xylenediamine, and diaminodiphenyl sulfone.

In certain embodiments, the compound of formula (b) has formula:

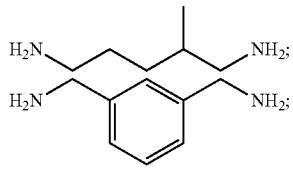

or a combination thereof.

In certain embodiments, $R^3$ is a $C_2$-$C_{20}$-alkylenyl, or a $C_2$-$C_{10}$-alkylenyl. In certain embodiments, $R^3$ is a $C_6$-alkylenyl wherein the compound of formula (c) is

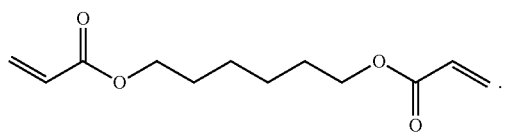 [SMILES: C=CC(=O)OCCCCCCOC(=O)C=C]

Compounds and compositions disclosed herein may contain asymmetric centers and can thus occur as racemates and racemic mixtures, single enantiomers, diastereomeric mixtures and individual diastereomers. Additional asymmetric centers may be present depending upon the nature of the various substituents on the molecule. Each such asymmetric center will independently produce two optical isomers and it is intended that all of the possible optical isomers and diastereomers in mixtures and as pure or partially purified compounds are included within the scope of this invention. The present invention is meant to comprehend all such isomeric forms of these compounds.

3. Synthetic Methods

The disclosed compositions can be better understood in connection with the following synthetic schemes and methods which illustrate a means by which the compositions can be prepared.

Scheme 1

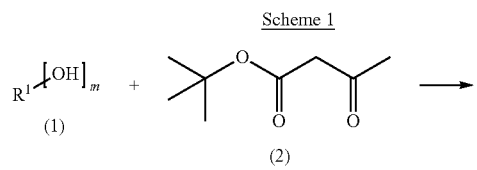

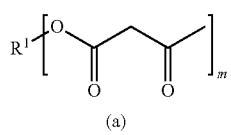

(a)

Acetoacetylated compounds of formula (a) can be prepared as shown in Scheme 1. A polyhydric alcohol compound of formula (1) can be treated with tert-butyl acetoacetate of formula (2) to provide a multi-functional acetoacetate ester compound of formula (a).

Glycerol triacetoacetate and sucrose multi-functionalized with triacetoacetate groups were each synthesized according to Scheme 1. The weight of evolved tert-butanol showed about 84% (6.7-7.0) of the available hydroxyl groups of sucrose had reacted (8.0 are available). Infrared (IR) analysis showed typical ketoester absorbances at 1750 cm$^{-1}$ and 1720 cm$^{-1}$ for the carbonyls, and 1630 cm$^{-1}$ for the enol. The data for glycerol triacetoacetate showed about 100% reaction (2.9-3.0) of the hydroxyl groups; and the IR analysis showed similar ketoester absorbances for the diagnostic region.

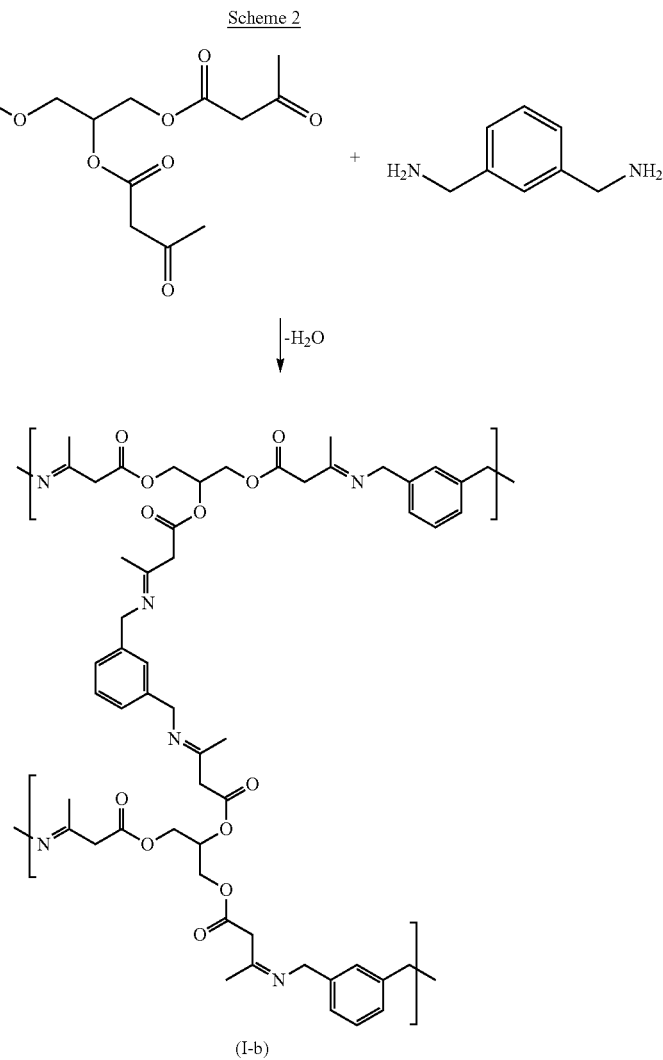

Foam compositions of formula (I-b), for example, can be synthesized as shown in Scheme 2. Glycerol triacetoacetate and xylene diamine can be combined to provide a foam composition of formula (I-b). The water produced in the reaction may serve as a blowing agent (e.g., a chemical blowing agent) to aid in the foam production.

not limited to, catalysts comprising tin, bismuth, zinc, iron, manganese, nickel, or cobalt, or a combination thereof. For example, a tin catalyst (e.g., dimethylbis[(1-oxoneodecyl)oxy]stannane) may be used in the reaction of Scheme 1. In certain embodiments, the reactions may further include solvents or additives. For example, one or more blowing

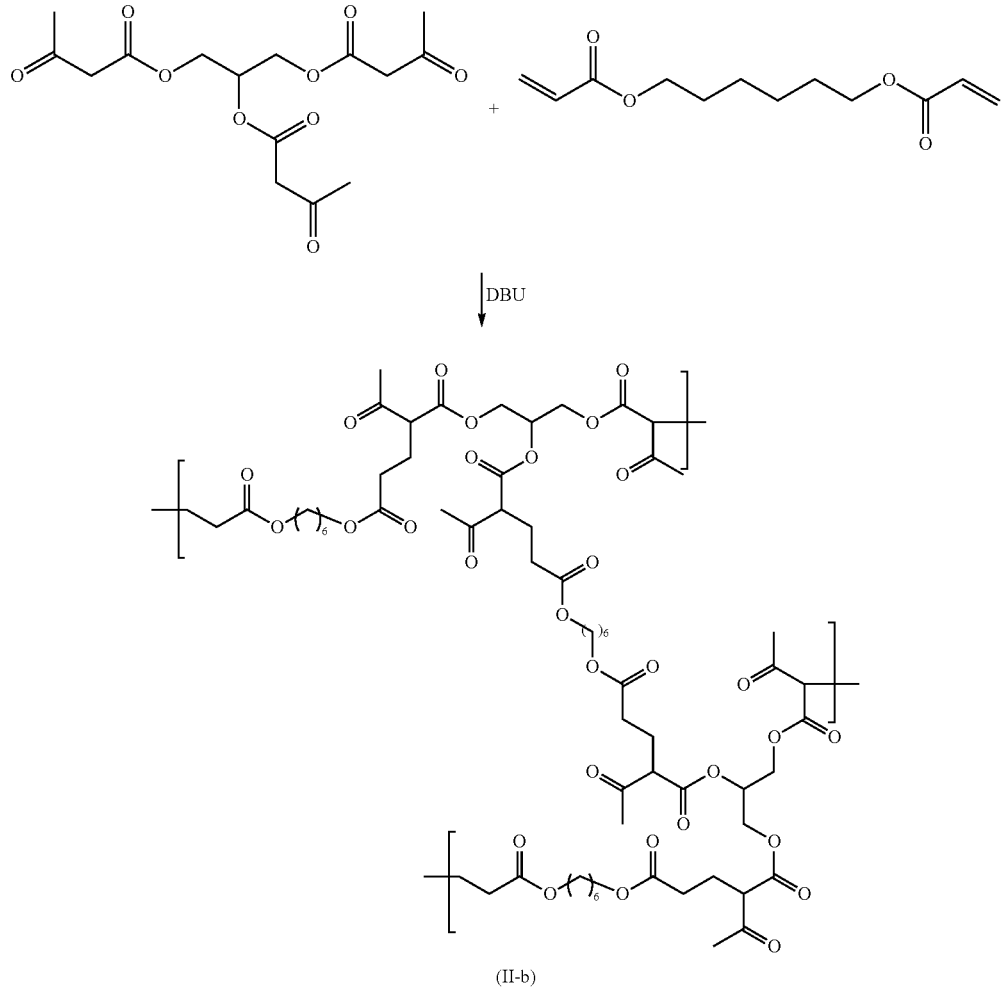

Foam compositions of formula (II-b), for example, can be synthesized as shown in Scheme 3. Glycerol triacetoacetate and hexane diacrylate can be combined in the presence of a base (e.g., 1,8-diazabicyclo[5.4.0]undec-7-ene) to provide a foam composition of formula (II-b).

In certain embodiments, the products may be further modified, for example, by manipulation of substituents. These manipulations may include, but are not limited to, reduction, oxidation, organometallic cross-coupling, alkylation, acylation, and hydrolysis reactions which are commonly known to those skilled in the art. In some cases, the order of carrying out the foregoing reaction schemes may be varied to facilitate the reaction or to avoid unwanted reaction products.

In certain embodiments, one or more catalysts may be used in the foregoing reactions to initiate or assist with foam formation. Suitable metal-based catalysts include, but are agents or surfactants may be present to aid in the formation of the physical foam structure or augment foam physical properties.

4. Additives

The foam compositions can include one or more additives.

The foam compositions can include one or more blowing agents. Suitable blowing agents include compounds with low boiling points which are vaporized during the exothermic polymerization reaction. Such blowing agents are generally inert and therefore do not decompose or react during the polymerization reaction. In certain embodiments, at least one of the one or more blowing agents has a gas phase thermal conductivity of less than or equal to 0.016 W/m·K or less than or equal to 0.014 W/m·K or less than or equal to 0.012 W/m·K at 25° C. Examples of inert blowing agents include, but are not limited to, carbon dioxide, chlorofluorocarbons, hydrogenated fluorocarbons, hydrogenated chlorofluorocarbons, acetone, and low-boiling hydrocarbons such as cyclopentane, isopentane, n-pentane, and their mixtures. Specific exemplary blowing agents include, but are not limited to, 1,1,4,4,4-hexafluoro-2-butene; carbon dioxide; hydrocarbons such as pentane, isopentane, cyclopentane petroleum ether, and ether; hydrochlorofluorocarbons such as 1,1-dichloro-1-fluoroethane (HCFC-141b); 2,2-dichloro-1,1,1-trifluoroethane (HCFC-123); 1-chloro-1,1-difluoroethane (HCFC-142b); 1,1,1,2-tetrafluoroethane (HCFC-134a); 1,1,1,3,3-pentafluoropropane (HFC-245fa) available from Honeywell (Morristown, N.J.); 1,1,1,3,3-pentafluorobutane (HFC-365) available as Solkane® 365mfc from Solvay Chemicals (Bruxelles, Belgium); incompletely halogenated hydrocarbons such as 2-chloropropane; fluorocarbons such as dichlorodifluoromethane, 1,2-dichloro-1,1,2,2-tetrafluoroethane (CFC-114), trichlorotrifluoroethane (CFC-113), trichloromonofluoromethane (CFC-11), z 1,1,1,4,4,4-hexafluoro-2-butene (under the trade names FEA 1100 and Formacel® 1100, supplied by DuPont; the CAS (Chemical Abstracts System) Number is 692-49-9). In certain embodiments, the blowing agent is water.

In certain embodiments, a blowing agent is generated in situ during foam formation. For example, enamine formation upon reaction of acetoacetate esters with amines yields water as a byproduct, and the water may act as a blowing agent (e.g., a chemical blowing agent).

The foam compositions can include one or more surfactants. A surfactant can be employed to stabilize the foaming reaction mixture while curing. Such surfactants normally comprise a liquid or solid organosilicone compound. The surfactants are employed in amounts sufficient to stabilize the foaming reaction mixture against collapse and to prevent the formation of large, uneven cells. Suitable surfactants include, but are not limited to, those sold under the trade name "TEGOSTAB®" by Goldschmidt Chemical Company, such as TEGOSTAB® B-8407 surfactant; TEGOSTAB® B-8474 surfactant; TEGOSTAB® B-2219 surfactant; TEGOSTAB® B-8870 surfactant; TEGOSTAB® B-8433 surfactant; TEGOSTAB® B-8404 surfactant; TEGOSTAB® B-8462 surfactant; TEGOSTAB® B-8467 surfactant; TEGOSTAB® B-8465 surfactant; and TEGOSTAB® B-8470 surfactant. Another example of a suitable surfactant is SURFONIC® N-120 surfactant which is commercially available from Huntsman Petrochemical Corporation of The Woodlands, Tex. Surfactants may also include silicone surfactants and combinations of surfactants. In certain embodiments, about 0.1% to about 5% by weight of surfactant based on the total weight of all foaming ingredients are used. In certain embodiments, about 1.5% to about 3% by weight of surfactant based on the total weight of all foaming ingredients are used.

The foam compositions can include one or more flame retardants. Suitable flame retardants include, but are not limited to, phosphorus-containing flame retardants selected from the groups of the mono- and oligomeric phosphoric and phosphonic esters, phosphonate amines, phosphonates, phosphinates, metal dialkylphosphinates (e.g., aluminium tris[dialkylphosphinates] and zinc bis[dialkylphosphinates]), phosphites, hypophosphites, phosphine oxides, phosphazenes; and nitrogen-containing flame retardants individually or in a mixture, such as for example, melamine oxalate, melamine phosphate prim., melamine phosphate sec., and melamine pyrophosphate sec., reaction products of melamine with condensed phosphoric acids and reaction products of condensates of melamine with phosphoric acid or with condensed phosphoric acids, in particular melamine polyphosphate, and also the reaction products of melamine and polyphosphoric acid with basic aluminium compounds, with basic magnesium compounds and/or with basic zinc compounds, and also melamine cyanurate and amine neopentyl glycol borate; guanidine salts, such as guanidine carbonate, guanidine cyanurate prim., guanidine phosphate prim., guanidine phosphate sec., guanidine sulphate prim., guanidine sulphate sec., guanidine pentaerythrityl borate, guanidine neopentyl glycol borate, urea phosphate, and urea cyanurate. It is also possible to use condensates of melamine, in particular melem, melam, melon, or compounds of this type with higher level of condensation, and reaction products of these with condensed phosphoric acids; tris(hydroxyethyl) isocyanurate and reaction products thereof with carboxylic acids, benzoguanamine and its adducts and its salts, and its products substituted on nitrogen, and also adducts and salts of these. Other nitrogen-containing components that can be used are allantoin compounds, and salts of these with phosphoric acid, boric acid or pyrophosphoric acid, and also glycol urils and salts of these; and any combination of the foregoing. In certain embodiments, the flame retardant is selected from phosphate flame retardants, melamine flame retardants, tris(2-chloropropyl)phosphate (TCPP), tris(2-chloroethyl)phosphate (TCEP), tris(1,3-dichloroisopropyl) phosphate (TDCPP), dimethylmethylphosphonate (DMMP), and diethylene glycol (DEG) and propylene glycol (PG) esters of tetrabromophthalic anhydride (ME-TBPA), or any combination thereof. In certain embodiments, the disclosed compositions can include expanded graphite as a flame retardant. When crystalline flaky graphite is oxidized with concentrated sulfuric acid and a hydrogen peroxide solution, washed with water, and then put into a high-temperature expansion furnace, it is expanded in the direction of a c axis of graphite crystal. The crystalline flaky graphite expanded to 100~700% of initial volume thereof is referred to as "expanded graphite."

The foam compositions can include one or more catalysts. Suitable catalysts include, but are not limited to, tin catalysts (e.g., dimethylbis[(1-oxoneodecyl)oxy]stannane)).

A variety of other ingredients may be included in the formulations for making foams. Examples of optional components include, but are not limited to, cell stabilizers such as silicones, crosslinking agents, chain extenders, pigments, preservatives, antioxidants, reinforcing agents, antistatic agents, fillers and combinations of any of these.

5. Foam Properties

The disclosed foam compositions can have one or more advantageous properties.

The foam compositions may have advantageous thermal insulation properties, assessed by thermal conductivity and thermal resistance. Thermal conductivity is an intrinsic property of a material that measures its capacity to sustain heat flow. The symbol used to denote thermal conductivity is k (or lambda, 4 referred to as the material's K-value. The reciprocal of thermal conductivity is thermal resistivity, an intrinsic property of a material to resist one-dimensional heat flow, referred to as the material's R-value. Thermal conductivity can be measured according to ASTM-0518.

The effectiveness of thermal insulation can be measured by its thermal resistance. In the insulation industry, the standard measure of an insulator's ability to resist thermal energy transfer is referred to as the insulation's R-value. The higher the R-value, the more effective the insulation. Knowing a material's R-value allows contractors, building inspectors, and homeowners to compare products and calculate the amount of insulation needed for a particular construction project. Additionally, regulatory agencies use R-values to establish recommended or mandatory guidelines for new buildings.

The disclosed compositions may have a K value of 0.125 to 0.3 BTU per inch/° F.-ft$^2$-h. The foam compositions may have a K value of 0.35 BTU per inch/° F.-ft$^2$-h or less, 0.25 BTU per inch/° F.-ft$^2$-h or less, 0.2 BTU per inch/° F.-ft$^2$-h or less, 0.17 BTU per inch/° F.-ft$^2$-h or less, 0.14 BTU per inch/° F.-ft$^2$-h or less, or 0.13 BTU per inch/° F.-ft$^2$-h or less.

The disclosed foam compositions may have an R value of 3.5 to 8° F.-ft$^2$-h/BTU per inch. The foam compositions may have an R value of 3° F.-ft$^2$-h/BTU per inch or greater, 4° F.-ft$^2$-h/BTU per inch or greater, 5° F.-ft$^2$-h/BTU per inch or greater, 6° F.-ft$^2$-h/BTU per inch or greater, 7° F.-ft$^2$-h/BTU per inch or greater, or 8° F.-ft$^2$-h/BTU per inch or greater.

The foam compositions may have a glass transition temperature of 40° C. to 150° C.

The foam compositions may have a foam density of 0.1 lb/ft$^3$ to 30 lb/ft$^3$, 0.5 lb/ft$^3$ to 10 lb/ft$^3$, 1.5 lb/ft$^3$ to 10 lb/ft$^3$, 1.7 lb/ft$^3$ to 3.5 lb/ft$^3$, 1.5 lb/ft$^3$ to 2.5 lb/ft$^3$, or 1.7 lb/ft$^3$ to 2.5 lb/ft$^3$.

The foam compositions may have a cream time of 1 second to 5 seconds, or 2 seconds to 4 seconds. The foam compositions may have a start to rise time of 2 seconds to 17 seconds, or 4 seconds to 8 seconds. The foam compositions may have a tack free time of 4 seconds to 30 seconds, or 8 seconds to 12 seconds.

The foam compositions may be resistant to molding or fungus growth, as measured by ASTM C1338. The foam compositions may not serve as a food source for insects or rodents.

The foam compositions may have negligible air infiltration, as measured according to ASTM E283-04. The foam compositions may have a water vapor infiltration of greater than 1 perm or $5.72 \times 10^{-8}$ g/Pa-s-m$^2$.

The foam compositions may have little or no odor.

6. Methods of Use

The disclosed foam compositions are useful in a variety of sealing and insulation applications. These include, for example, building insulation such as for walls, foundations, floors and roofs; gap and crack filling and crack repair applications in buildings, masonry and other structures; vehicular cavity-filling applications, and the like. The foams are also useful in producing boardstock insulation and/or construction materials by spraying or applying the uncured foam onto a facing material (such as, for example, a fiber layer, a wood or metal layer, and the like). The foam compositions may be injected for use in low temperature applications (e.g., refrigerators, freezers, refrigerated trailers, walk-in cold-storage).

The foam compositions can be applied using spray foam equipment. The spray foam equipment may include separate containers for each of the A-side and B-side components. The containers can each be in fluid connection with a separate conduit, which each are in fluid communication with a mixing chamber which in turn is in fluid communication with a nozzle. Upon opening the containers (via the opening of a suitable valve in each of the containers), the A-side component and B-side component can be pneumatically pumped from their containers into the respective conduits. The A-side and B-side components may then be brought to the mixing chamber under pressure from an electric or hydraulic pump, for example at a pressure of 500-2,000 psi, 800-2,000 psi, or 900-1,200 psi, and combined in a mixing device to form a reaction mixture. The mixing device may be a static mixer, a mix chamber, or other mixhead. The reaction mixture can then be expelled through a nozzle or other orifice. The conduit before the spray gun can be heated, for example, to a temperature of 70° F. to 200° F. or from 90° F. to 140° F. The expelled reaction mixture typically forms a spray which is directed to a mold or other surface upon which the polymeric foam is to be applied. The expelled reaction mixture typically forms a spray or a foam bead, depending in part on the nozzle size and type and the viscosity of the exiting material, which is directed to a mold or other surface upon which the polymeric foam is to be applied. The reaction mixture is then cured in situ. Suitable spray foam equipment includes that described in, for example, U.S. Pat. No. 8,568,104, U.S. Pat. No. 6,991,185, and U.S. Published Patent Application No. 2004-0109992, each of which is herein fully incorporated by reference in its entirety. An exemplary electric pump and proportioner that may be used includes an electric foam proportioner for medium- to high-output foam insulation applications that applies up to 30 lb (13.6 kg) per minute (e.g., Reactor E-20 available from Graco, Minneapolis, Minn.). An exemplary hydraulic pump and proportioner that may be used includes a hydraulic foam proportioner for medium to high-output foam applications and roofing projects that applies up to 52 lb (23.6 kg) per minute (e.g., Reactor H-25, H-40 or H-50 available from Graco). An exemplary air purge spray gun may be a plural-component spray gun for high output spray foam applications, available from Graco.

In certain embodiments, a preblend of certain materials is prepared prior to reacting the foam components [e.g., the compound of formula (a) and the compound of formula (b)]. For example, foam expansion agents, surfactants, catalysts and other foaming ingredients can each individually be blended with one or both of the foam reactants to provide one or more blends of the reaction components; and then the respective blend(s) can be combined to provide the reaction mixture resulting in a foam composition. Alternatively, all the foaming ingredients may be introduced individually to the mixing zone where the foam reactants [e.g., the compound of formula (a) and the compound of formula (b)] are contacted. It is also possible to pre-react all or a portion of the foam reactants to form a prepolymer (e.g., a polymer with reduced crosslinking).

7. Kits

Disclosed are kits for conveniently and effectively implementing the disclosed methods. Such kits may include a compound or composition of the invention, and optionally one or more of instructions, packaging, and dispensers. Kit components may be packaged for either manual or partially or wholly automated practice of the foregoing methods. In other certain embodiments, a kit includes the disclosed foam reactants, and optionally instructions for their application as a foam material.

The disclosed compounds, compositions, methods and processes will be better understood by reference to the following examples, which are intended as an illustration of and not a limitation upon the scope of the invention.

8. Examples

Differential scanning calorimetry (DSC) was used to determine glass transition temperature. Thermogravimetric analysis was used to determine decomposition onset temperature. Equipment that can be used to prepare foam compositions includes a high speed mixer; a stop watch; a balance; and calipers, among other equipment.

A. Synthesis of Acetoacetate Ester Starting Materials

Example 1

Synthesis of Sucrose and Glycerin Acetoacetates Using Tert-Butyl Acetoacetate

Acetoacetylation was conducted at two ratios of sucrose to glycerin: 4/1 and 5/1. For the 4/1 preparation, 160 grams of sucrose was charged to a 2 L flask equipped with a mechanical stirrer, Dean-Stark trap, reflux condenser and temperature sensing thermocouple attached to a Thermowatch. Forty grams of glycerin was added and this mixture was heated at 100° C. until a quasi-homogeneous mixture was obtained (1.0-1.5 hours, some of the sucrose was dissolved, but it was all at least coated with glycerin). Tert-butyl acetoacetate (864 grams) was added and this mixture was heated at 125-135° C. until the evolution of t-butanol ceased (3.0-3.5 hours). Samples were taken for viscosity measurements. Before any t-butanol had evolved the viscosity was about 2,600-3,000 centipoise (cps). As the reaction proceeded the viscosity decreased at first (down to about 200 cps), however, at the end the viscosity was up to 3,300 cps.

For the 5/1 preparation, the same procedure was used with the appropriate ratios of sucrose and glycerin (167 grams sucrose and 33 grams of glycerin).

Example 2

Synthesis of Sucrose and Glycerin Acetoacetates Using 2,6-trimethyl-4H-1,3-dioxan-4-one Sucrose and glycerin acetoacetates were prepared using 2,2,6-trimethyl-4H-1,3-dioxan-4-one (structure below) as a starting material. A 2 L flask equipped with a Dean-Stark trap, reflux condenser and thermometer, was charged with 100.3 g of sucrose and 335 g of 2,2,6-trimethyl-4H-1,3-dioxan-4-one (TDO). The reaction mixture was brought to 96° C. at which point the evolution of acetone commenced. Acetone was collected over the next 1.5 hours until distillation stopped. The quantity of acetone collected showed that ~98 mol % of the available hydroxyl groups had reacted. The product was then tested as per the material obtained from the t-butyl acetoacetate synthesis. It performed the same according to the previous Examples. This synthetic route provides for synthesis of the product at lower temperature and at higher conversion levels.

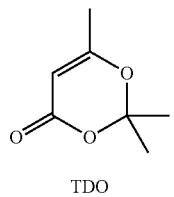

TDO

B. Preparation of Foam Compositions

Table 1 summarizes exemplary components used to prepare the foam compositions. The components are prepared by methods described herein or methods known in the art. All other chemical components are purchased from commercial sources.

TABLE 1

Sucrose Acetoacetate
Glycerine Acetoacetate
Tin Catalyst (dimethylbis[(1-oxoneodecyl)oxy] stannane)
Meta xylene diamine (MXDA)
Dytek A (2-methyl-1,5-diaminopentane)
Tegostab B-8407 (polyether modified siloxane surfactant)
Tegostab B-8221 (surfactant)
Tris(2-chloropropyl)phosphate (TCPP)-fire retardant
HFC-365mfg (blowing agent)

Example 3

Foam compositions were prepared using a two-part system (e.g., side A and side B). Table 2 summarizes the components and amounts used to prepare an exemplary foam composition.

TABLE 2

| Side A | | |
|---|---|---|
| Sucrose Acetoacetate | 25.00 | grams (gr) |
| Glycerine Acetoacetate | 25.00 | gr |
| Tin Catalyst (dimethylbis[(1-oxoneodecyl)oxy] stannane) | 1.49 | gr |
| Side B | | |
| Meta xylene diamine (MXDA) | 14.83 | gr |
| Dytek A (2-methyl-1,5-diaminopentane) | 9.83 | gr |
| Tegostab B-8407 (polyether modified siloxane surfactant) | 0.80 | gr |
| Tegostab B-8221 (surfactant) | 0.50 | gr |
| Tris(2-chloropropyl)phosphate (TCPP)-fire retardant | 15.38 | gr |
| HFC-365mfg (blowing agent) | 3.00 | gr |

Side A: 50 grams of a 1:1 mixture (by weight) of sucrose acetoacetate and glycerine acetoacetate were measured into a container (Side A). 1.49 grams of catalyst were added to side A. Side A was mixed and set to the side. Hexane diol diacrylate (0.40 gr) was optionally added to side A.

Side B: 14.83 grams of MXDA were added to a new container (Side B). 9.83 grams of Dytek A was added to side B. 0.80 grams of Tegostab B-8407 was added to side B. 0.50 grams of Tegostab B-8221 was added to side B. 15.38 grams of Tris(2-chloropropyl)phosphate (TCPP) was added to side B. 3.00 grams of blowing agent was added side B. Side B was mixed until a clear solution was obtained.

A rigid foam was prepared by adding Side B to Side A. The mixture was stirred under high shear for 3-5 seconds. A foam bun resulted. A cream time of 2-3 seconds was observed. The start to rise time of the foam was 5-14 seconds depending on catalyst composition and catalyst concentration. Tack-free time occured at 5-8 seconds as well. The measured density of the foam was 2.7 to 5 lbs/ft$^3$. The measured $T_g$ of the foam was 57° C. The decomposition onset temperature of the foam was 210° C.

The formulation of Table 2 generated a foam with good cell structure, which is small and symmetric throughout the foam.

Example 4

Foam compositions can be prepared with acetoacetates mixed with diamines and a surfactant. Table 3 summarizes the components and amounts used to prepare an exemplary foam composition.

TABLE 3

| Side A | |
|---|---|
| Sucrose Acetoacetate | 25.00 grams (gr) |
| Glycerine Acetoacetate | 25.00 gr |
| Side B | |
| Meta xylene diamine (MXDA) | 14.83 gr |
| Dytek A (2-methyl-1,5-diaminopentane) | 9.83 gr |
| Tegostab B-8407 (polyether modified siloxane surfactant) | 0.80 gr |

The formulation of Table 3 provided a foam with a cream time of about 3-5 seconds. The start to rise time of the foam was 13-18 seconds. The density of the foam was determined to be about 5 lbs/ft³. The foam was prepared without the use of a physical blowing agent.

Prophetic Example 1

Bulk up the composition in Example 3 to 15,000 total grams for each side in 5 gallon plastic pails. The compositions are fed via pnumatic transfer pumps to a Graco HVR proportioner. The proportioner settings are as follows: Material Temperature 75 F, A and B side preheaters and line temperatures range from 90 F to 120 F and the pump pressure range from 1000 to 1200 psi. The resulting foam ranges in density from 1.7 lb/cubic ft to 2.7 lb/cubic ft and exhibits normal cell structure and physical foam characteristics.

Prophetic Example 2

Bulk up the composition in Example 3 to 15,000 total grams for each side in 5 gallon plastic pails. The compositions are fed via pnumatic transfer pumps to a Graco E20 proportioner. The proportioner settings are as follows: Material Temperature 75 F, A and B side preheaters and line temperatures range from 110 F to 160 F and the pump pressure ranges from 800 to 1000 psi. The resulting foam ranges in density from 1.3 lb/cubic ft to 1.8 lb/cubic ft and exhibits normal cell structure and physical foam characteristics.

It is understood that the foregoing detailed description and accompanying examples are merely illustrative and are not to be taken as limitations upon the scope of the invention, which is defined solely by the appended claims and their equivalents.

For reasons of completeness, various aspects of the disclosure are set out in the following numbered clauses:

Clause 1. A foam comprising the reaction product of a compound of formula (a) with a compound of formula (b); or the reaction product of a compound of formula (a) with a compound of formula (c);

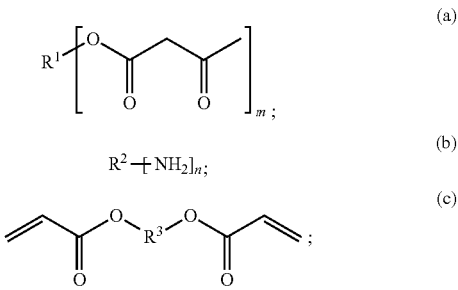

wherein $R^1$, $R^2$, and $R^3$, at each occurrence, are each independently selected from a saturated or unsaturated, linear, branched, or cyclic hydrocarbon group, wherein each hydrocarbon group optionally includes one or more heteroatoms; an aromatic group; a heteroaromatic group; and a heterocyclic group; or any combination thereof; wherein said groups, at each occurrence, are independently unsubstituted or substituted with one or more suitable substituents; m is 2 to 200; and n is 2 to 200.

Clause 2. The foam of clause 1, wherein m=3.

Clause 3. The foam of clause 1 or clause 2, wherein the compound of formula (a) is

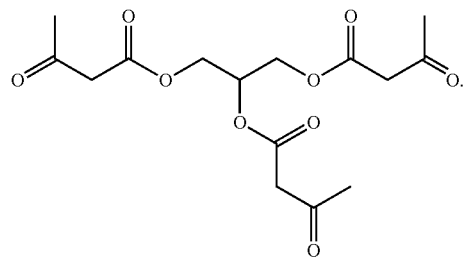 [SMILES: CC(=O)CC(=O)OCC(COC(=O)CC(C)=O)OC(=O)CC(C)=O]

Clause 4. The foam of clause 1, wherein m=7 or 8.

Clause 5. The foam of clause 1 or clause 4, wherein the compound of formula (a) is

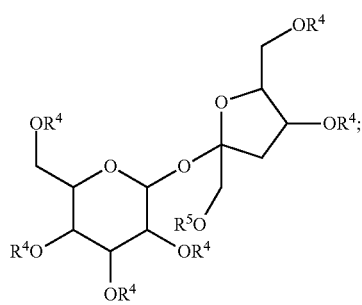

wherein $R^4$, at each occurrence, is independently selected from —H and —C(O)CH$_2$C(O)CH$_3$, provided that at least two $R^4$ groups are —C(O)CH$_2$C(O)CH$_3$; and $R^5$ is —H or —C(O)CH$_2$C(O)CH$_3$.

Clause 6. The foam of any one of clauses 1-5, wherein n=2.

Clause 7. The foam of any one of clauses 1-6, wherein the compound of formula (b) is

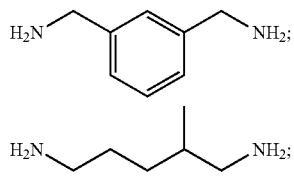

or a combination thereof.

Clause 8. The foam of any one of clauses 1-7, wherein $R^3$ is $C_2$-$C_{10}$-alkylenyl.

Clause 9. The foam of any one of clauses 1-8, wherein the compound of formula (c) is

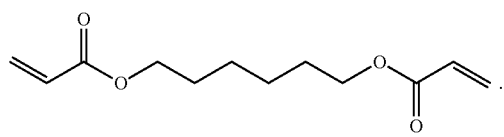 [SMILES: C=CC(=O)OCCCCCCOC(=O)C=C]

Clause 10. The foam of any one of clauses 1-9, wherein the foam has formula (I-a):

(I-a)

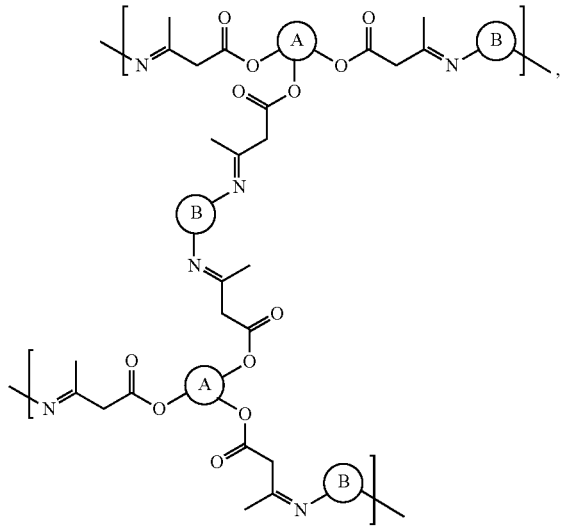

wherein A and B, at each occurrence, are each independently selected from a saturated or unsaturated, linear, branched, or cyclic hydrocarbon group, wherein each hydrocarbon group optionally includes one or more heteroatoms; an aromatic group; a heteroaromatic group; and a heterocyclic group; or any combination thereof; wherein said groups, at each occurrence, are independently unsubstituted or substituted with one or more suitable substituents.

Clause 11. The foam of clause 10, wherein A is derived from glycerol triacetoacetate, a sorbitol acetoacetate, an erythritol acetoacetate, a multi-functionalized acetoacetate ester of a monosaccharide or a disaccharide, or a combination thereof; and B is derived from xylene diamine, 2-methyl-1,5-diaminopentane, or a combination thereof.

Clause 12. The foam of clause 11, wherein the disaccharide is sucrose.

Clause 13. The foam of clause 1, wherein the foam has formula (I-b), (I-b)

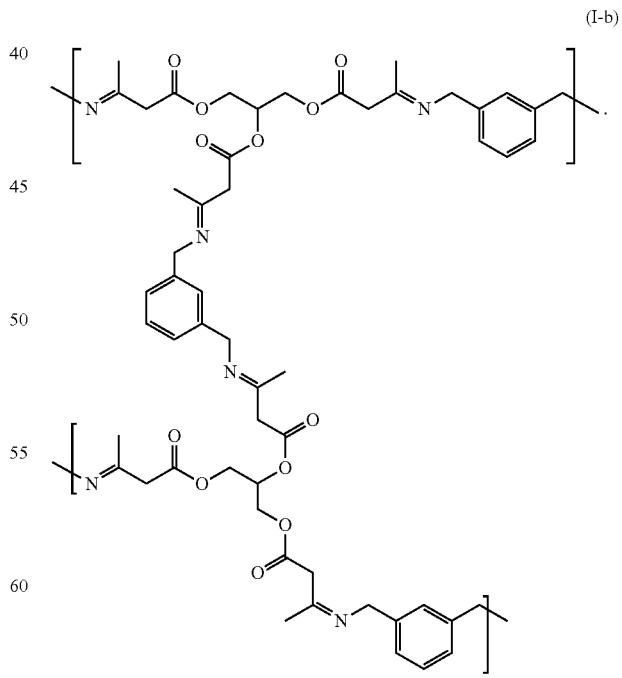

Clause 14. The foam of any one of clauses 1-9, wherein the foam has formula (II-a):

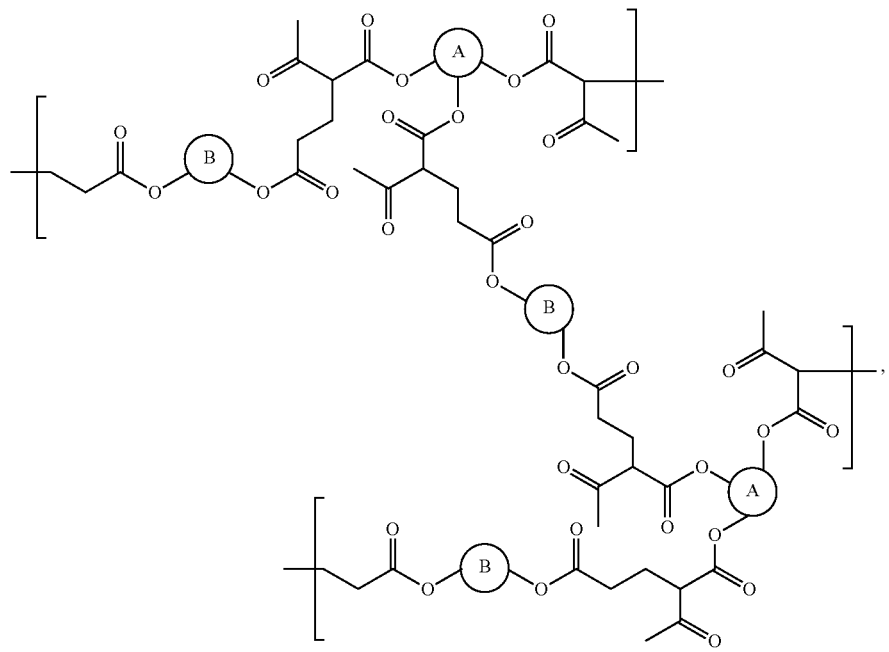

(II-a)

wherein A and B, at each occurrence, are each independently selected from a saturated or unsaturated, linear, branched, or cyclic hydrocarbon group, wherein each hydrocarbon group optionally includes one or more heteroatoms; an aromatic group; a heteroaromatic group; and a heterocyclic group; or any combination thereof; wherein said groups, at each occurrence, are independently unsubstituted or substituted with one or more suitable substituents.

Clause 15. The foam of clause 1, wherein the foam has formula (II-b),

Clause 16. The foam of any one of clauses 1-13, wherein water produced as a consequence of reaction between compound (a) and compound (b) acts as a chemical blowing agent.

Clause 17. The foam of any one of clauses 1-16, wherein the foam is a rigid foam or a semi-rigid foam.

Clause 18. A method of preparing a foam, comprising reacting a compound of formula (a) with a compound of formula (b); or reacting a compound of formula (a) with a compound of formula (c):

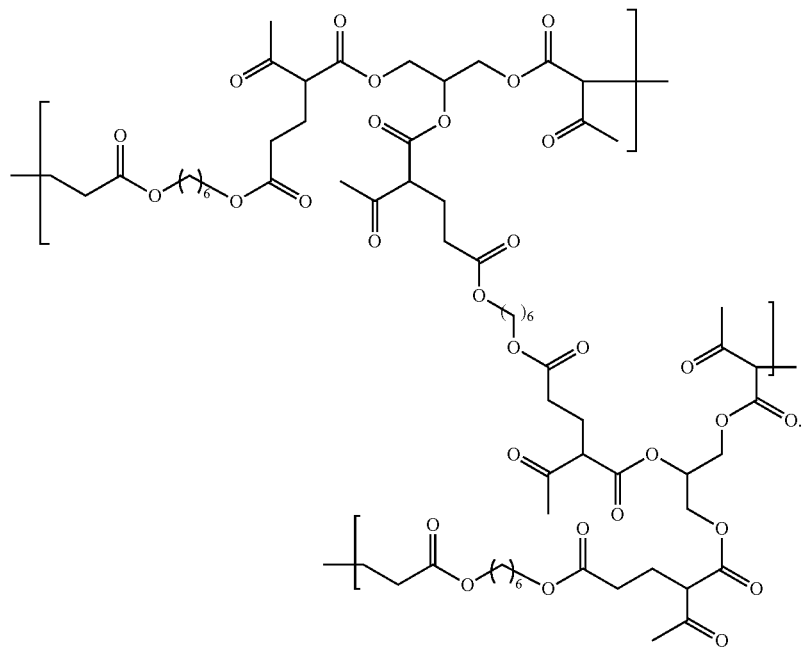

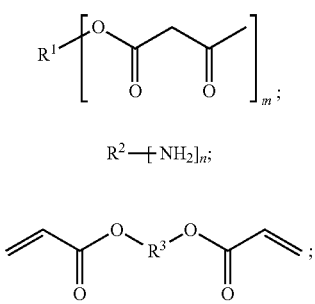

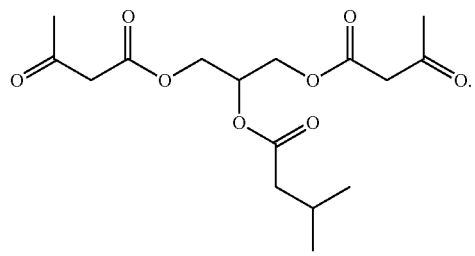

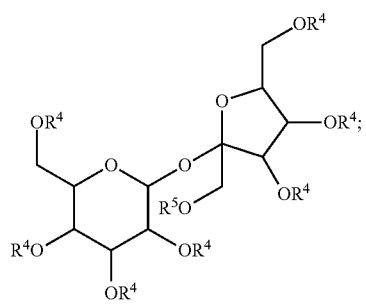

wherein $R^1$, $R^2$, and $R^3$, at each occurrence, are each independently selected from a saturated or unsaturated, linear, branched, or cyclic hydrocarbon group, wherein each hydrocarbon group optionally includes one or more heteroatoms; an aromatic group; a heteroaromatic group; and a heterocyclic group; or any combination thereof; wherein said groups, at each occurrence, are independently unsubstituted or substituted with one or more suitable substituents; m is 2 to 200; and n is 2 to 200.

Clause 19. The method of clause 18, wherein m=3.

Clause 20. The method of clause 18 or clause 19, wherein the compound of formula (a) is Clause 21. The method of clause 18, wherein m=7 or 8.

Clause 22. The method of clause 18 or clause 21, wherein the compound of formula (a) is wherein $R^4$, at each occurrence, is independently selected from —H and —C(O)CH$_2$C(O)CH$_3$, provided that at least two $R^4$ groups are —C(O)CH$_2$C(O)CH$_3$; and $R^5$ is —H or —C(O)CH$_2$C(O)CH$_3$.

Clause 23. The method of any one of clauses 18-22, wherein n=2.

Clause 24. The method of any one of clauses 18-23, wherein the compound of formula (b) is

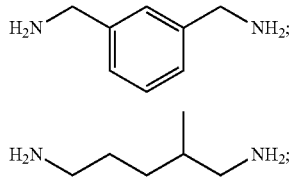

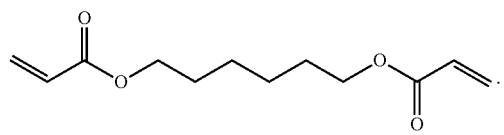 [SMILES: C=CC(=O)OCCCCCCOC(=O)C=C]

or a combination thereof.

Clause 25. The method of any one of clauses 18-24, wherein $R^3$ is $C_2$-$C_{10}$-alkylenyl.

Clause 26. The method of any one of clauses 18-25, wherein the compound of formula (c) is Clause 27. The method of any one of clauses 18-26, wherein the foam has formula (I-a):

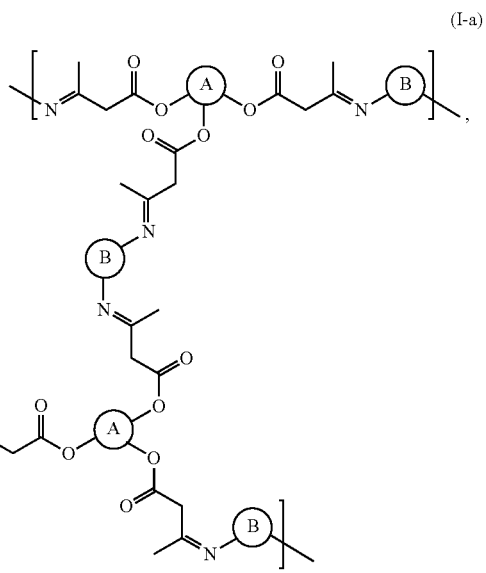

(I-a)

wherein A and B, at each occurrence, are each independently selected from a saturated or unsaturated, linear, branched, or cyclic hydrocarbon group, wherein each hydrocarbon group optionally includes one or more heteroatoms; an aromatic group; a heteroaromatic group; and a heterocyclic group; or any combination thereof; wherein said groups, at each occurrence, are independently unsubstituted or substituted with one or more suitable substituents.

Clause 28. The method of clause 27, wherein A is derived from glycerol triacetoacetate, a sorbitol acetoacetate, an erythritol acetoacetate, a multi-functionalized acetoacetate ester of a monosaccharide or a disaccharide, or a combination thereof; and B is derived from xylene diamine, 2-methyl-1,5-diaminopentane, or a combination thereof.

Clause 29. The method of clause 28, wherein the disaccharide is sucrose.

Clause 30. The method of clause 18, wherein the foam has formula (I-b),

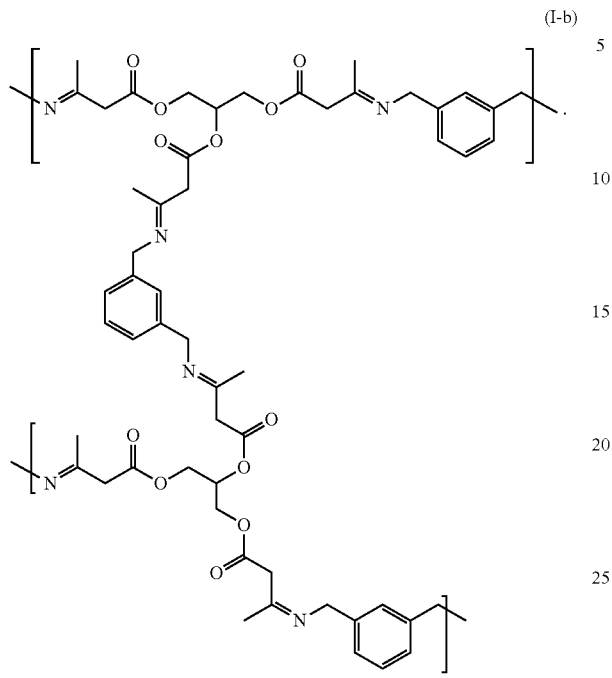

(I-b)

Clause 31. The method of any one of clauses 18-26, wherein the foam has formula (II-a):

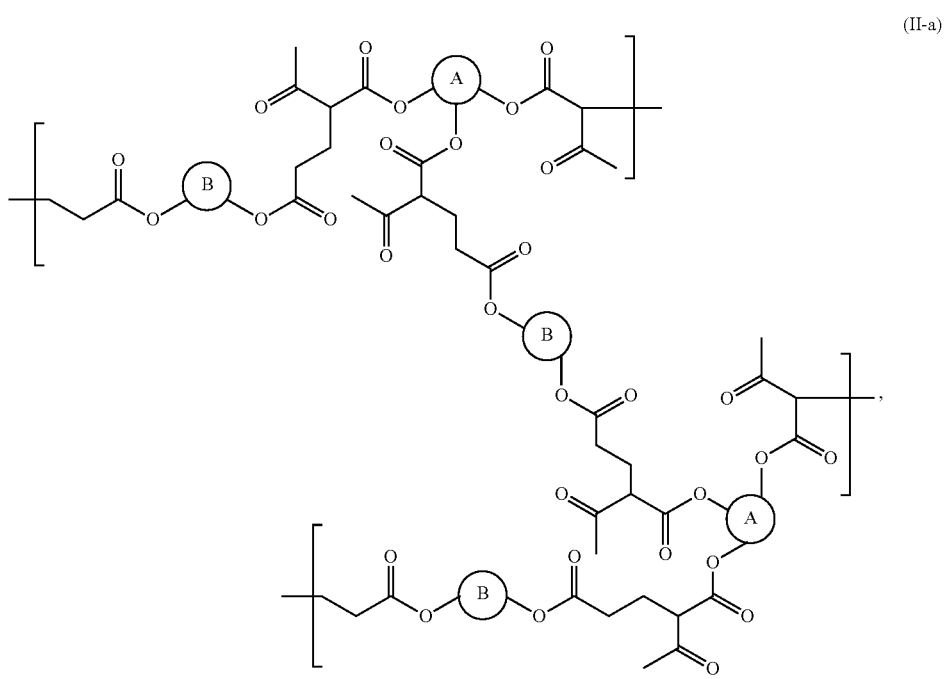

(II-a)

wherein A and B, at each occurrence, are each independently selected from a saturated or unsaturated, linear, branched, or cyclic hydrocarbon group, wherein each hydrocarbon group optionally includes one or more heteroatoms; an aromatic group; a heteroaromatic group; and a heterocyclic group; or any combination thereof; wherein said groups, at each occurrence, are independently unsubstituted or substituted with one or more suitable substituents.

Clause 32. The method of clause 18, wherein the foam has formula (II-b),

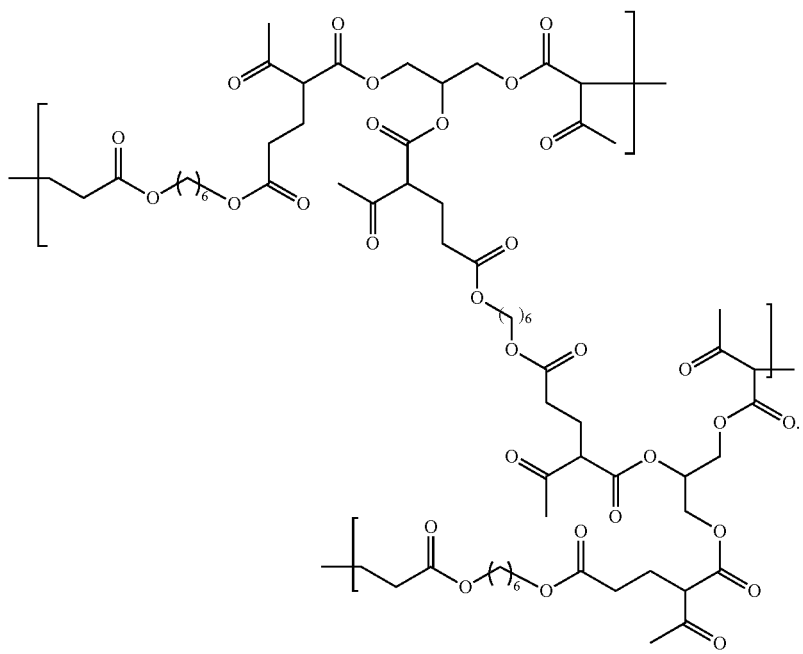

Clause 33. The method of any one of clauses 18-30, wherein water produced as a consequence of reaction between compound (a) and compound (b) acts as a chemical blowing agent.

Clause 34. The method of any one of clauses 18-33, wherein the foam is a rigid foam or a semi-rigid foam.

Clause 35. The method of any one of clauses 18-34, wherein the compound of formula (a) and the compound of formula (b); or the compound of formula (a) and the compound of formula (c) are pneumatically pumped from separate first and second containers to respective first and second conduits.

Clause 36. The method of clause 35, wherein the compound of formula (a) and the compound of formula (b); or the compound of formula (a) and the compound of formula (c) are brought from their respective first and second conduits to a mixing chamber under pressure from an electric or hydraulic pump, the compound of formula (a) and the compound of formula (b); or the compound of formula (a) and the compound of formula (c) forming a reaction mixture.

Clause 37. The method of clause 36, wherein the pressure is 500-2,000 psi, 800-2,000 psi, or 900-1,200 psi.

Clause 38. The method of clause 36 or clause 37, wherein the reaction mixture is pumped from the mixing chamber to a third conduit, and from the third conduit to a nozzle or orifice, wherein the reaction mixture is expelled through the nozzle or orifice.

Clause 39. The method of clause 38, wherein the third conduit is heated to a temperature of 70° F. to 200° F. or from 90° F. to 140° F.

Clause 40. The method of clause 38 or clause 39, wherein the expelled reaction mixture is directed to a mold or other surface.

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use of the invention, may be made without departing from the spirit and scope thereof.

What is claimed is:

1. A method of preparing a foam, comprising reacting a compound of formula (a) with a compound of formula (b);

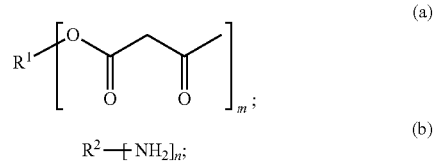

wherein $R^1$, and $R^2$, at each occurrence, are each independently selected from a saturated or unsaturated, linear, branched, or cyclic hydrocarbon group, wherein each hydrocarbon group optionally includes one or more heteroatoms; an aromatic group; a heteroaromatic group; and a heterocyclic group; or any combination thereof; wherein said groups, at each occurrence, are independently unsubstituted or substituted with one or more suitable substituents;
m is 2 to 200; and
n is 2 to 200;
wherein the compound of formula (a) and the compound of formula (b) are pneumatically pumped from separate first and second containers to respective first and second conduits.

2. The method of claim 1, wherein the compound of formula (a) and the compound of formula (b) are brought from their respective first and second conduits to a mixing chamber under pressure from an electric or hydraulic pump, the compound of formula (a) and the compound of formula (b) forming a reaction mixture.

3. The method of claim 2, wherein the pressure is 500-2,000 psi.

4. The method of claim 2, wherein the reaction mixture is pumped from the mixing chamber through a third conduit to a nozzle or orifice and expelled through the nozzle or orifice.

5. The method of claim 4, wherein the third conduit is heated to a temperature of 70° F. to 200° F.

6. The method of claim 1, wherein water produced as a consequence of reaction between compound (a) and compound (b) acts as a chemical blowing agent.

* * * * *